United States Patent
Aikens et al.

(10) Patent No.: US 12,397,999 B2
(45) Date of Patent: Aug. 26, 2025

(54) METHOD AND SYSTEM FOR WIRELESS COMMUNICATION IN A CONVEYOR SYSTEM

(71) Applicant: ATS CORPORATION, Cambridge (CA)

(72) Inventors: Stephen Aikens, Cambridge (CA); Martin Juritsch, Cambridge (CA); Albert Kleinikkink, Cambridge (CA); Calin Alexander, Cambridge (CA)

(*) Notice: Subject to any disclaimer, the term of this patent is extended or adjusted under 35 U.S.C. 154(b) by 780 days.

(21) Appl. No.: 17/710,167

(22) Filed: Mar. 31, 2022

(65) Prior Publication Data
US 2022/0315348 A1 Oct. 6, 2022

Related U.S. Application Data

(60) Provisional application No. 63/168,729, filed on Mar. 31, 2021.

(51) Int. Cl.
*G06F 7/00* (2006.01)
*B65G 43/08* (2006.01)
(Continued)

(52) U.S. Cl.
CPC .......... *B65G 43/08* (2013.01); *B65G 47/905* (2013.01); *B65G 47/914* (2013.01); *H02J 50/10* (2016.02);
(Continued)

(58) Field of Classification Search
CPC .... B65G 43/08; B65G 47/905; B65G 47/914; B65G 2203/0258; B65G 17/00;
(Continued)

(56) References Cited

U.S. PATENT DOCUMENTS

| | | | |
|---|---|---|---|
| 6,708,385 B1 * | 3/2004 | Lemelson | B23Q 7/03 29/563 |
| 2003/0168316 A1 | 9/2003 | Knepple et al. | |

(Continued)

FOREIGN PATENT DOCUMENTS

| | | | | |
|---|---|---|---|---|
| CN | 107239073 A | * | 10/2017 | B61L 23/14 |
| EP | 2599186 A1 | * | 6/2013 | B60L 13/03 |

(Continued)

OTHER PUBLICATIONS

European Search Report, European Patent Office, on corresponding EP Application No. 22165826.3, dated Sep. 14, 2022.

*Primary Examiner* — Yolanda R Cumbess
(74) *Attorney, Agent, or Firm* — Amarok IP Inc.; Neil W. Henderson

(57) ABSTRACT

A method and system for wireless communication in a conveyor system. The method includes: formulating a command from a master controller to an accessory controller; translating the command into a simplified protocol; transmitting the simplified command via a wireless communications channel; receiving the simplified command at a wireless receiver; processing the simplified command by the accessory controller; formulating a response to the master controller from the accessory controller; transmitting the response via the wireless communications channel; and translating the response for handling by the master controller. The system includes: a downlink converter/transmitter configured to translate a command into a simplified protocol and send a simplified command via a wireless signal; an accessory receiver/transmitter configured to receive the wireless signal; and an accessory interface configured to communicate the simplified command to the accessory for execution.

20 Claims, 23 Drawing Sheets

(51) Int. Cl.
 *B65G 47/90*  (2006.01)
 *B65G 47/91*  (2006.01)
 *H02J 50/10*  (2016.01)
 *H04L 67/12*  (2022.01)
 *H04W 4/33*  (2018.01)
 *H04W 4/50*  (2018.01)
 *H04W 4/70*  (2018.01)
 *H05B 1/02*  (2006.01)
 *F25B 21/02*  (2006.01)
 *G01L 5/00*  (2006.01)
 *G01L 21/00*  (2006.01)
 *H05B 3/00*  (2006.01)

(52) U.S. Cl.
 CPC .............. *H04L 67/12* (2013.01); *H04W 4/33* (2018.02); *H04W 4/50* (2018.02); *H04W 4/70* (2018.02); *H05B 1/023* (2013.01); *B65G 2203/0258* (2013.01); *F25B 21/02* (2013.01); *G01L 5/009* (2013.01); *G01L 21/00* (2013.01); *H05B 3/0014* (2013.01)

(58) Field of Classification Search
 CPC ........ B65G 21/00; B65G 35/06; B65G 35/08; B65G 37/00; B65G 47/24; B65G 47/90; B65G 49/00; B65G 54/00; B65G 51/00; B65G 61/00; B65G 2201/00; B65G 2203/00; B65G 2207/00; B65G 2811/00; H02J 50/10; H02J 50/80; H02J 50/005; H04L 67/12; H04W 4/33; H04W 4/50; H04W 4/70; H05B 1/023; H05B 3/0014; F25B 21/02; G01L 5/009; G01L 21/00
 USPC .................. 700/213, 228, 230, 3, 11, 19–20
 See application file for complete search history.

(56) References Cited

U.S. PATENT DOCUMENTS

2006/0289273 A1* 12/2006 Knepple ................ B65G 47/30
                198/781.05
2013/0026002 A1* 1/2013 Spangler .............. B65G 35/066
                198/339.1
2017/0320669 A1* 11/2017 Kilibarda ................ B66C 17/06

FOREIGN PATENT DOCUMENTS

| WO | WO-2010099611 A1 * | 9/2010 | ........... B23Q 7/1447 |
| WO | WO-2019046879 A1 * | 3/2019 | ............. B65G 1/026 |
| WO | 2020105192 A1 | 5/2020 | |

* cited by examiner

| Parameter Name | Size | Notes |
|---|---|---|
| Enable System | Bit 0 | Initialize and apply motor voltage<br>Bit 0=1→Enable Operation<br>Bit 0=0→Stop |
| Acknowledge Faults | Bit 1 | Performs "Fault Reset" Command |
| Spare | Bit 2 | |
| Spare | Bit 3 | |
| I/O output 1 | Bit 4 | Output signal to device |
| I/O output 2 | Bit 5 | Output signal to device |
| I/O output 3 | Bit 6 | Output signal to device |
| I/O output 4 | Bit 7 | Output signal to device |
| Simple Command ID | 1 byte | Up to 255 configurable commands (1 to 255) |

FIG. 17A

| Parameter Name | Size | Notes |
|---|---|---|
| System Enabled | Bit 0 | High in Enabled State |
| System Faulted | Bit 1 | High in Faulted State |
| System Heartbeat | Bit 2 | Toggles between 0 and 1 |
| Command Complete | Bit 3 | Turns on when the sent command is processed |
| I/O input 1 | Bit 4 | Input signal to master |
| I/O input 2 | Bit 5 | Input signal to master |
| I/O input 3 | Bit 6 | Input signal to master |
| I/O input 4 | Bit 7 | Input signal to master |

FIG. 17B

METHOD AND SYSTEM FOR WIRELESS COMMUNICATION IN A CONVEYOR SYSTEM

FIELD

This application generally relates to conveyor systems and methods, and more specifically to wireless communications in a conveyor system, including wireless communication with an accessory provided to a moving element in the conveyor system.

BACKGROUND

One issue for conveyor systems, including belt or scroll driven conveyors as well as, more recently, linear motor driven conveyors, is that it can be difficult to provide power for use on the moving element/pallet when the moving element/pallet is moving. For example, it can be useful to have power available on the moving element in order to power accessories on the moving element/pallet so that operations can be performed either while the moving element is moving, or operations can be performed on the pallet without connecting an outside power source.

While power sources can be provided to a moving element/pallet by using batteries, the batteries can be bulky and require regular recharging. Power can also be provided by cabling, but this generally requires guidance systems for the cabling during movement and can limit the range of motion.

Some attempts have been made to provide power on moving elements/pallets for transport systems using inductive power. Most conventional inductive power transfer systems use a high frequency alternate current primary conductor for providing an electromagnetic field extending along the primary conductor and a pick-up unit with a secondary conductor for the inductive energy transfer. The primary conductor is typically located parallel to the motion path so that the space between the primary and secondary conductor remains essentially constant. As such, typical existing inductive power transfer systems: (a) radiate an electromagnetic field along the entire motion path irrespective of the location of any pick-up units; (b) use a single fixed frequency power supply to energize the primary conductor; (c) require intelligent pick-up units to provide on/off control and/or variable power output; and (d) have a situation in which unintended coupling on an unexpected receiver could result in power leakage or damage, for example, to unshielded electronic equipment, or personal injury, for example jewellery being worn by a user being heated by energy transfer.

Other inductive power systems may also require onboard energy storage, such as batteries, to compensate for periods when the moving element is not sufficiently coupled to a power source.

Still further, the accessories that can be provided on a pallet/moving element may also be somewhat limited due to the limits of inductive power transfer in some situations and/or because of the need to provide power from batteries or via cabling or the like.

Once power is available for any accessories on the pallet, it can become important to be able to provide wireless communications with the accessories, particularly as the accessories become more complex. In this case, the reliability of communications and the bandwidth available become important considerations as the high speeds and accelerations of modern conveyor systems require very fast and precise control of both the moving elements and the accessories thereon.

Accordingly, there is a need for an improved system and method for providing wireless communications within a conveyor system to handle accessories that receive the power provided to the moving element.

SUMMARY

According to an aspect herein, there is provided a method for wireless communication with an accessory on a moving element in a conveyor system, the method including: formulating a command from a master controller to an accessory controller; translating the command into a simplified protocol; transmitting the simplified command via wireless communications channel; receiving the simplified command at a wireless receiver; processing the simplified command by the accessory controller; formulating a response to the master controller from the accessory controller; transmitting the response via the wireless communications channel; and translating the response for handling by the master controller. In this aspect, the simplified protocol is intended to provide redundancy and utilize reduced bandwidth as compared with a conventional protocol.

In some cases, the method may further include, between the receiving and processing, translating the simplified command from the simplified protocol to an accessory protocol and, between the formulating a response and transmitting the response, translating the response from an accessory protocol to a simplified protocol.

In some cases, the simplified protocol may include a signal at a predetermined frequency to indicate that communications are active. The use of this type of signal eliminates the need to additional messaging to check on availability or the like.

In some cases, the simplified protocol may include a command code that can be translated to provide a more complex sequence of commands. The use of command codes can allow a table or the like to be used to look up a sequence of commands based on the code in order to reduce the bandwidth needed for each message.

In some cases, the simplified protocol may include messages of fewer than 2 bytes.

In some cases, the translating into simplified protocol may include selecting a command code related to a series of commands.

In some cases, the simplified protocol may include sending a plurality of similar messages over a short time frame for redundancy purposes.

According to another aspect herein, there is provided a system for wireless communication with an accessory on a moving element in a conveyor system, the system including: a downlink converter/transmitter configured to translate a command from a master controller into a simplified protocol and send a simplified command via a wireless signal; an accessory receiver/transmitter configured to receive the wireless signal and transmit a wireless response; and an accessory interface configured to communicate the simplified command to the accessory such that the accessory can execute the simplified command and formulate a response to be sent to the master controller.

In some cases, the accessory interface may also be configured to translate the simplified command into an accessory command that can be executed by the accessory.

In some cases, the simplified protocol may include a signal at a predetermined frequency to indicate that communications are active.

In some cases, the simplified protocol may include a command code that can be translated to provide a more complex sequence of commands.

In some cases, the accessory may receive power via induction from the conveyor system.

According to an aspect herein, there is provided a system for providing power to an accessory on a moving element on a conveyor while the moving element is moving, the system including: a plurality of moving elements, each moving element including one or more power pick-up panels; and at least one track section with which the plurality of moving elements are associated, the track section including: a track on which the plurality of moving elements move; and a track power system including a plurality of inductive panels, wherein the one or more power pick-up panels extend into gaps between the plurality of inductive panels such that the one or more power pick-up panels and the plurality of inductive panels overlap in an interlaced fashion. In this way, power is available to the accessory while the moving element is moving without the need for battery storage or the like. Further, the use of interlaced panels allows for consistent and adequate power to be transferred.

In some cases, the conveyor may include a controller configured to selectively activate the inductive panels when in the vicinity of the moving elements and/or when the accessory needs power to perform an operation.

According to another aspect herein, there is provided a method for providing power to an accessory on a moving element in a conveyor system while the moving element is moving, the method including: tracking a position of each of a plurality of moving elements in the conveyor system; and selectively operating a power system provided to the conveyor system based on the position of a power pick-up panel provided to the moving element such that power is independently transferred to each of the plurality of moving elements for use by the accessory.

According to another aspect herein, there is provided a moving element for use in a conveyor system, the moving element including: a plurality of power pick-up panels adapted to receive power from the transport system, wherein the plurality of power pick-up panels are provided as extensions toward the track and configured to interlace with inductive panels on the track.

There are various types of accessories that may be provided to, mounted on or otherwise connected with the moving elements in a conveyor system. In some cases, the accessories may use servo motors or the like to effect actions while the moving element is moving. The accessories may include and be controlled by, for example an accessory controller, that is also provided to the moving element and in communication with the servo motors or the like. The accessory controller can be controlled by a master controller or track section controller of the conveyor system to synchronize actions among the moving elements and the accessories.

According to another aspect herein, there is provided an accessory for use with a moving element in a conveyor system, the accessory including at least one rotary gripper, the rotary gripper including: a body; a gripper motor; a rotation motor; and a plurality of grippers, wherein the gripper motor is mechanically connected with and configured to open and close the plurality of grippers and the rotation motor is mechanically connected with and configured to rotate the plurality of grippers.

In this aspect, in some cases, the accessory may further include: a cam plate mechanically connected to the gripper motor; and cam followers in contact with the cam plate and each of the plurality of grippers, wherein movement of the cam plate by the gripper motor controls the opening and closing of the plurality of grippers via the cam followers. Still further, in some cases, the accessory may include a plurality of torsion springs provided to the cam followers configured to bias the grippers to a closed position.

According to another aspect herein, there is provided an accessory for use with a moving element in a conveyor system, the accessory including: an accessory controller provided to the moving element; and at least one gripper mounted on the moving element and in communication with the accessory controller, the gripper including: one or more gripper arms; and a drive mechanism configured to move the one or more gripper arms, wherein the accessory controller is configured to operate the gripper arms via the drive mechanism based on wireless communications from a master controller.

In this aspect, in some cases, the accessory may further include a weigh scale provided to the gripper arms configured to weigh a part held by the gripper arms. Also or alternatively, the accessory may include a sensor to detect the force of the gripper arms on a part.

According to another aspect herein, there is provided an accessory for use with a moving element in a conveyor system, the accessory including: an accessory controller provided to the moving element; and a vacuum system mounted on the moving element and in communication with the accessory controller, the vacuum system including: a vacuum pump; and one or more hoses connecting the vacuum pump to a vacuum outlet on the moving element, wherein the accessory controller is configured to control the vacuum pump to deliver vacuum at the vacuum outlet on the moving element.

In this aspect, the accessory may further include a sensor to detect the level of vacuum at the vacuum outlet.

According to another aspect herein, there is provided an accessory for use with a moving element in a conveyor system, the accessory including: an accessory controller provided to the moving element; and a heating system mounted on the moving element and in communication with the accessory controller, the heating system comprising a resistance heater, wherein the accessory controller is configured to control the temperature of the heater by adjusting the power flow through the heater.

According to another aspect herein, there is provided an accessory for use with a moving element in a conveyor system, the accessory including: an accessory controller provided to the moving element; and a cooling system mounted on the moving element and in communication with the accessory controller, the cooling system comprising a Peltier device, wherein the accessory controller is configured to control the temperature by adjusting the power flow through the Peltier device.

Various accessories may also include sensors of various types depending on the accessory. For example, grippers may include pressure sensors, heaters/coolers may include temperature sensors, or the like.

Generally speaking, the embodiments described herein are intended to overcome at least some of the issues with conventional systems and methods.

BRIEF DESCRIPTION OF THE DRAWINGS

The drawings included herewith are for illustrating various examples of systems and methods for providing power to moving elements in a transport system and are not intended to limit the scope of what is taught in any way. In the drawings:

FIG. 13C is a top view of the gripper system of FIG. 13A,

FIG. 17A is an example of a downlink message from a master controller to an accessory controller; and FIG. 17B is an example of an uplink message from an accessory controller to a master controller.

DETAILED DESCRIPTION

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein. The embodiments described herein are not intended to be limited to the specific details of any one example embodiment or to specific details that may be common to multiple, or all, example embodiments. The applicants, inventors or owners reserve all rights that they may have in any embodiments disclosed herein, for example the right to embodiments claimed in a continuing application, and do not intend to abandon, disclaim or dedicate to the public any such embodiments by disclosure of this document.

Figure 1:
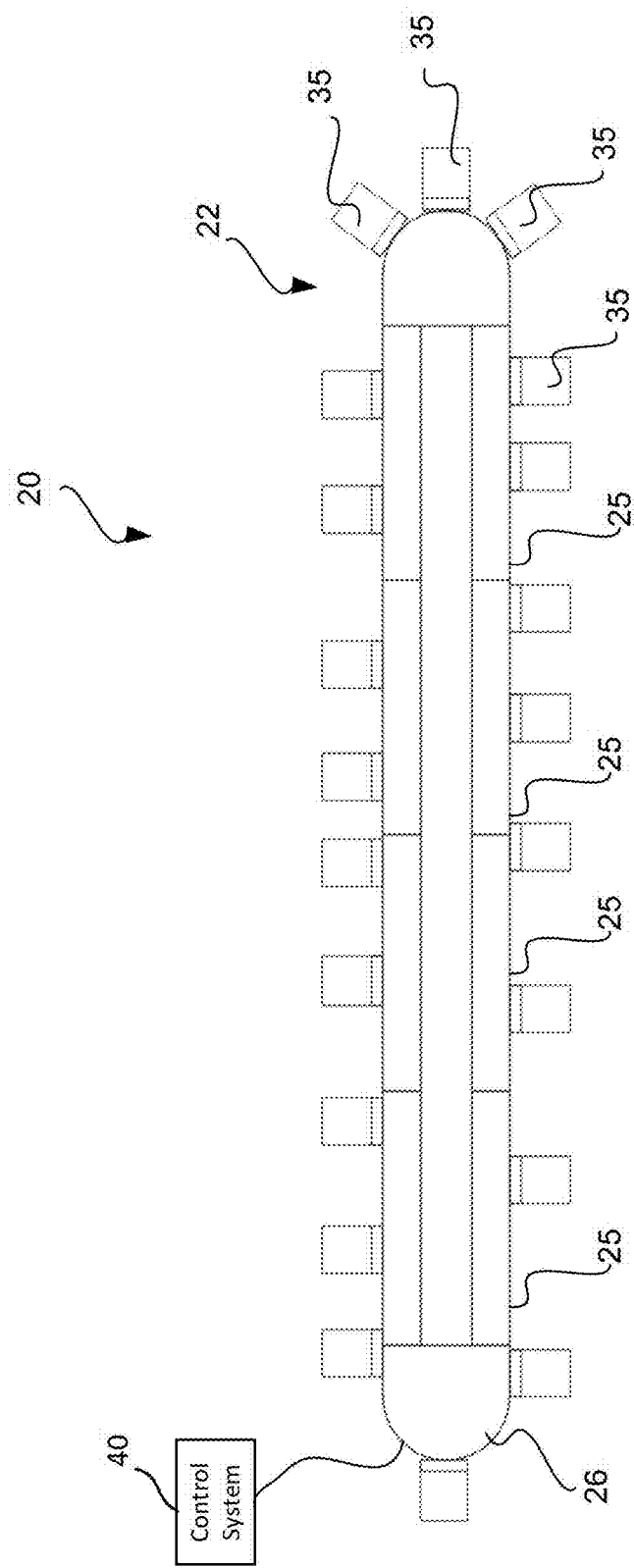
FIG. 1 is a schematic diagram of a conveyor system, in particular a modular conveyor system.

FIG. 1 shows a schematic diagram of an example conveyor system 20. The conveyor system 20 includes a track 22 made up of one or more track sections 25, 26 defining a track. In FIG. 1, a plurality of straight track sections 25 are provided with two curved sections 26. A plurality of moving elements 35 are provided to the track and move around on the conveyor system 20. In a manufacturing environment, the moving elements 35 are intended to travel between workstations (not shown) and may support a pallet or product (not shown) that is to be operated on automatically by, for example, a robot, while moving or at a workstation or may travel to a workstation or other work area intended for manual operations. Through the operation of the conveyor system 20, various operations are performed to provide for the fabrication or assembly of a product. In this disclosure, the terms "moving element" and "pallet" may sometimes be used interchangeably, depending on the context.

It will be understood that the modular nature of the track sections allow for various sizes and shapes of conveyors and any appropriate number of moving elements. In FIG. 1, the corner (or curved) track sections 26 are 180 degree turns but, in some configurations, the curved track sections 26 may have different angles such as 45, 90, 135 degree angles or the like. Some of the principles of operation of a particular type of linear motor conveyor system are described in more detail in, for example, U.S. Pat. No. 8,397,896 to Kleinikkink et al., which is hereby incorporated herein by reference.

As noted, the conveyor system 20 may include a plurality of track sections 25, 26, which are mechanically self-contained and separable from one another so as to be modular in nature. In order to be modular, each track section 25, 26 may house electronic circuitry and/or mechanical parts for powering and controlling the related track section 25, 26 and/or there may be a controller/control system 40 that controls the related track section or the track 22 overall (only one controller is shown but other controllers for track sections may be included as well). In some cases, a track controller may communicate or interface with track section controllers provided for each of the track sections 25, 26. The controller(s) may include a processor that executes a program stored on a machine readable medium. The machine-readable medium may be a part of the controller or at a remote location or the like.

In some types of conveyor systems, such as the linear motor conveyor system 20 shown in FIG. 1, the track 22 may produce a magnetic force for moving the moving element 35 along the track 22. The magnetic force can also capture, support or hold the moving element 35 on the track 22. The magnetic force is at least partly generated by the interaction of the magnetic flux created by magnetic elements (for example, embedded coils) of the track 22 and magnetic elements (for example, magnets) of the moving element 35. It will be understood that conveyor systems with different motor drives may be driven in other manners.

Figure 2:
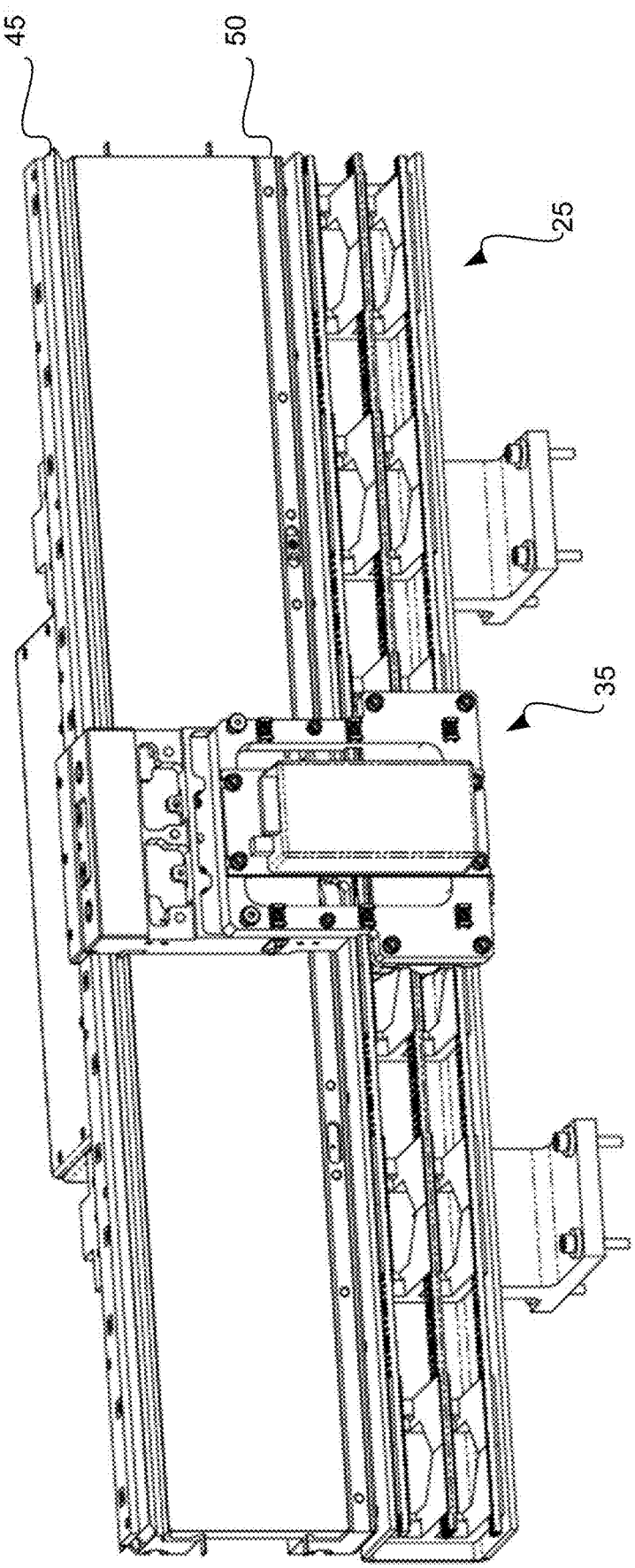
FIG. 2 is a perspective view of a track section of the modular conveyor system of FIG. 1 with a moving element.

FIG. 2 illustrates a perspective view of an embodiment of a straight track section 25 and a moving element 35. The track section 25 includes a guide rail 45 located in an upper portion of track section 25 and a lower guide rail 50. The moving elements 35 include bearings (not visible in FIG. 2) that run along a corresponding guide rail 45, 50.

In some embodiments, the track section 25 may produce a magnetic force for moving the moving element 35 along the track 22. The magnetic force can also capture/hold the moving element 35 on the track 22. In some cases, the magnetic force is created by the interaction of the magnetic flux created by coils (not shown) embedded in/under the track section 25 and magnetic elements (not shown) of the moving element 35. The magnetic force can be thought of as having a motive force component for directing movement of the moving element 35 along a direction of travel on the track 22, and a capturing force component to laterally hold the moving element 35 on the track 22 and in spaced relation to the track surface. In at least some conveyor systems, the motive force and the capturing force can be provided by the same magnetic flux.

Generally speaking, the track sections 25, 26 will be mounted on a support structure (not shown) so as to align and abut one another in order to form the track 22. As noted above, each track section may be controlled by a control system or by a track control system 40 that controls a plurality of or all of the track sections 25. The control system 40 controls each track section (and thus the track) to drive the moving elements and also receives data related to a position of the moving elements on the track such that the controller effectively controls the moving elements. In some embodiments, where the track uses a servo motor or the like rather than a linear motor to drive the moving elements, the control system 40 can control the servo motor and thus control the moving elements.

In embodiments herein, it will be understood that elements of each embodiment may be used with other embodiments as would be appropriate for the application desired.

Figure 3:
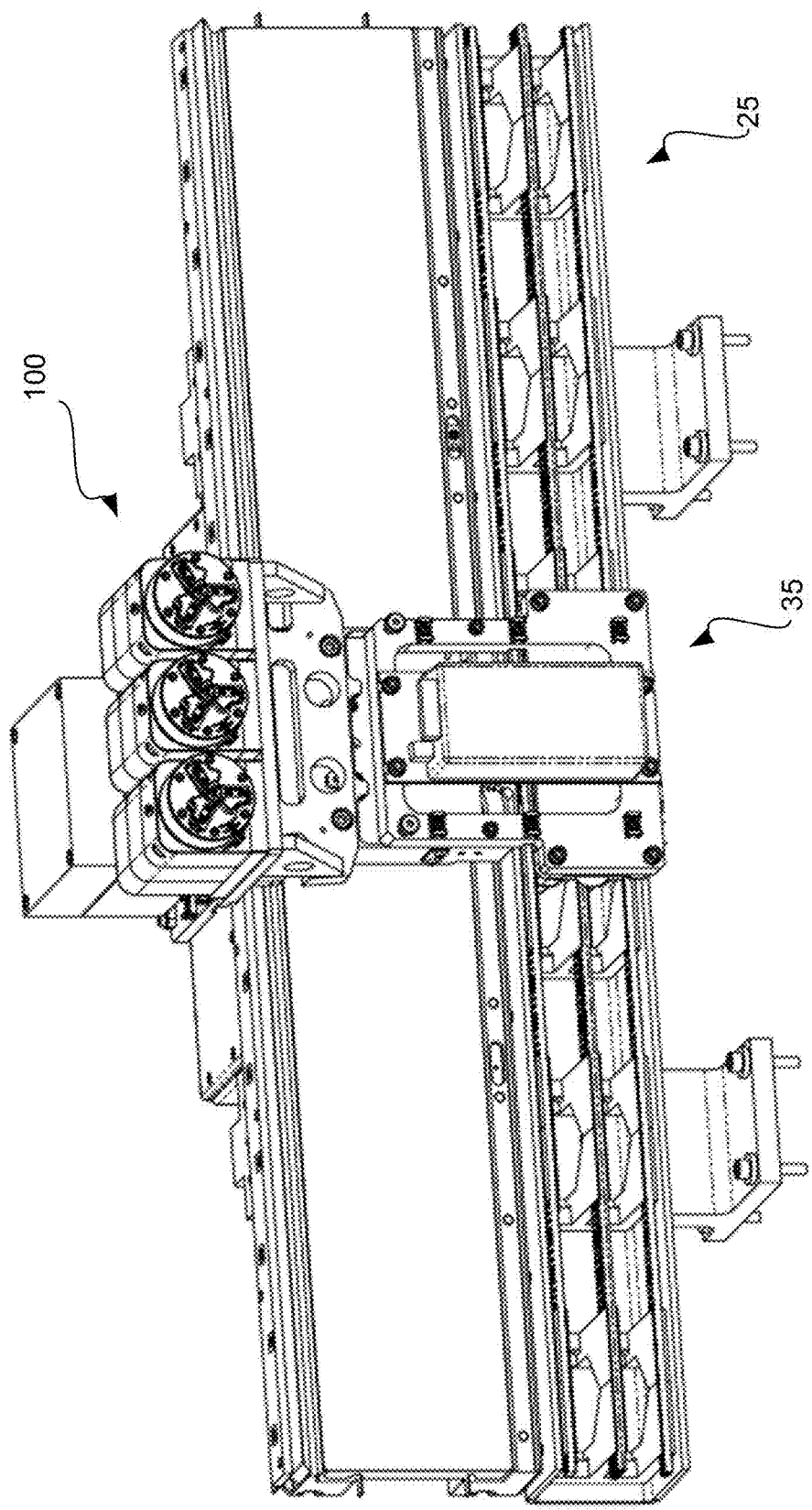
FIG. 3 is an expanded view of the track section of FIG. 2 with a moving element having an accessory thereon.
Figure 4:
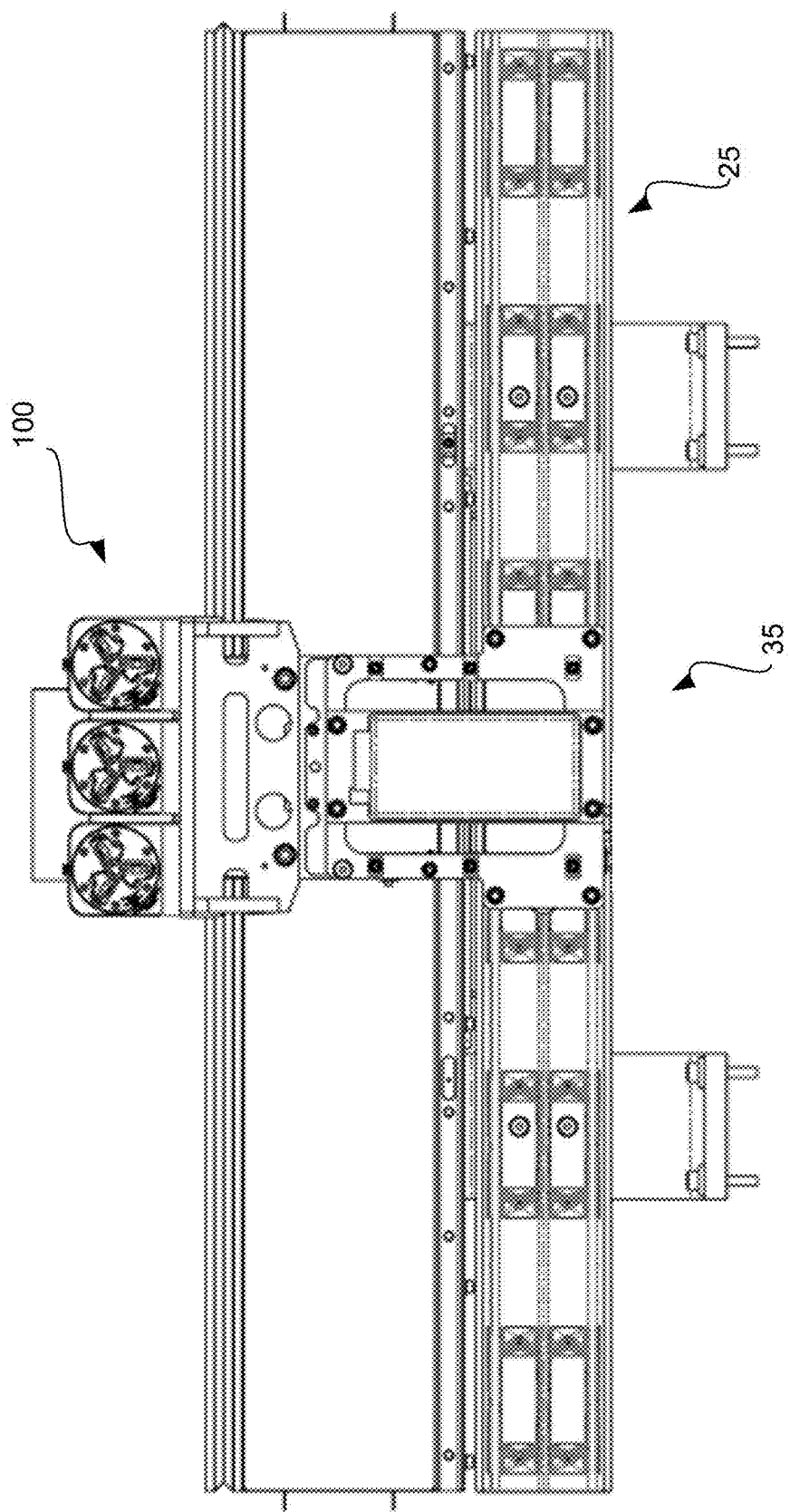
FIG. 4 is a front view of the track section of FIG. 3.
Figure 5:
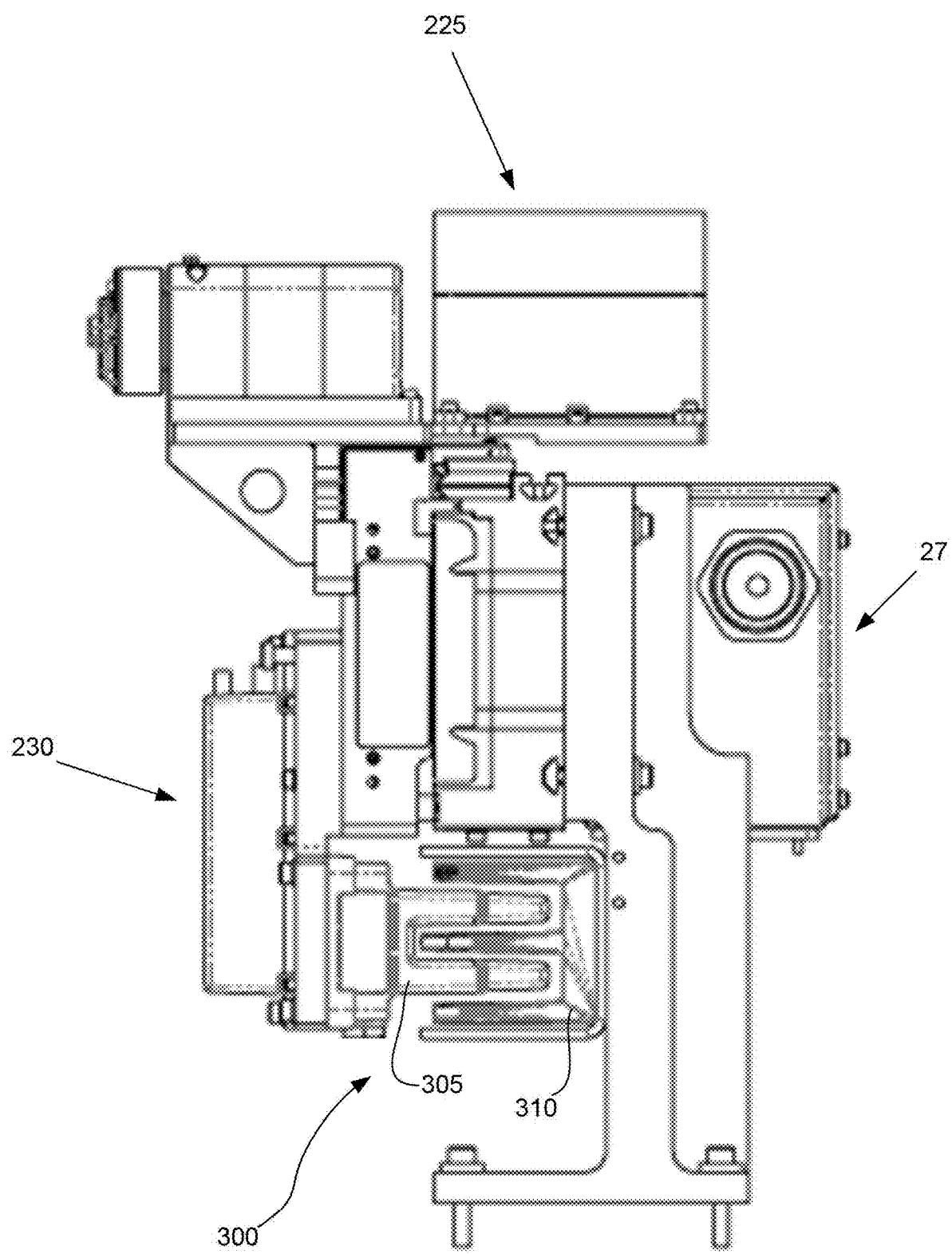
FIG. 5 is a sectional view of the track section of FIG. 3.
Figure 6:
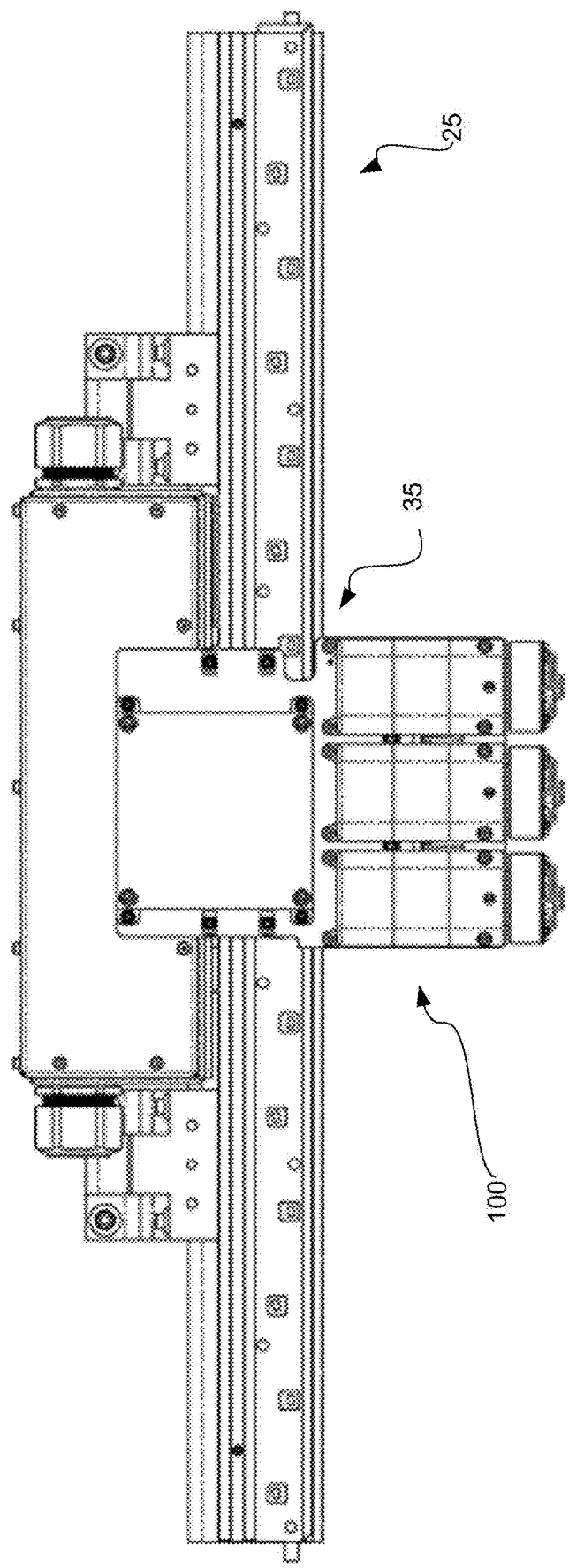
FIG. 6 is a top view of the track section of FIG. 3.
Figure 7:
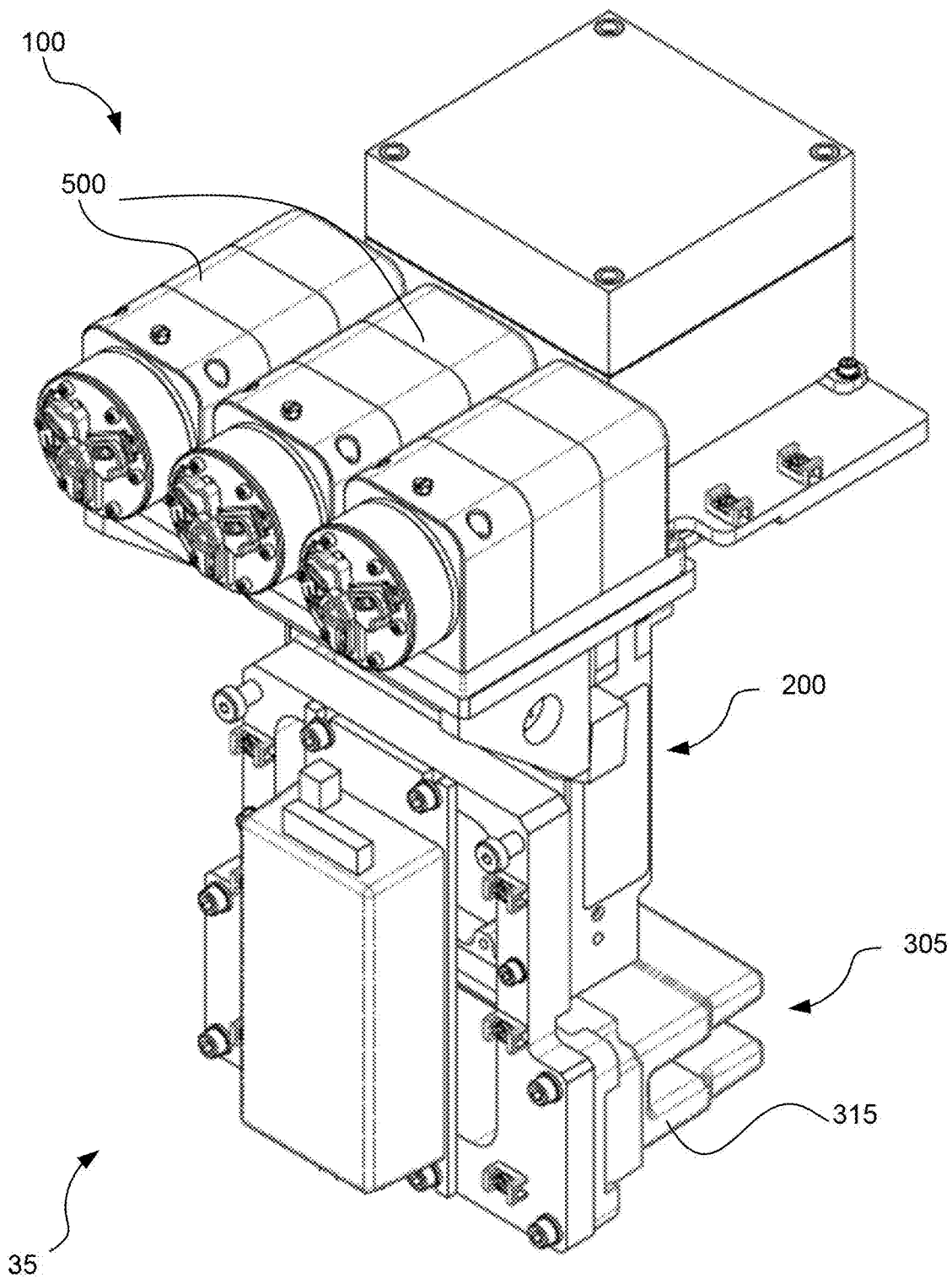
FIG. 7 is a front perspective view of an embodiment of a moving element.
Figure 8:
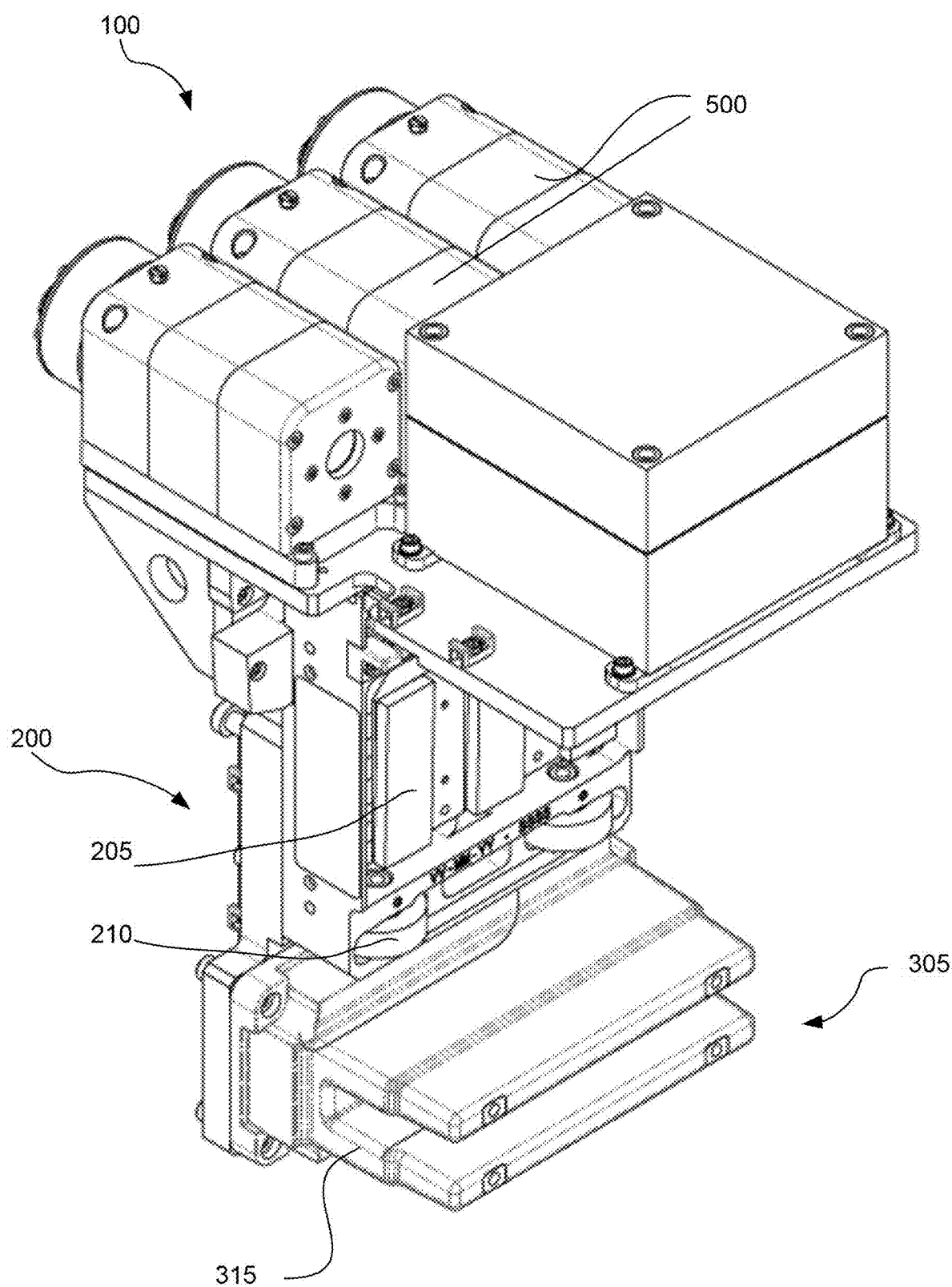
FIG. 8 is a rear perspective view of the moving element of FIG. 7.

FIG. 3 is a perspective view illustrating the track section 25 and moving element 35 of FIG. 2 as well as an accessory 100 mounted on the moving element 35. In some cases, the accessory may be mounted on a pallet, tooling plate or the like carried by the moving element 35. FIG. 4 is a front view of the track section of FIG. 3. FIG. 5 is a side cross-sectional view of FIG. 4. FIG. 6 is a top view of FIG. 4. FIG. 7 is a front perspective view of the moving element and the accessories. FIG. 8 is a back perspective view of the moving element and the accessories.

As shown, each moving element 35 includes a body 200 which supports one or more permanent magnets 205 disposed to provide a magnetic flux orientated normal to the track section 25. Each moving element 35 includes upper bearings (not shown) and lower bearings 210 which ride along upper 45 and lower 50 guide rails of the track section 25.

The track section 25 and the moving element 35 include a system 300 for transferring power wirelessly between the track section 25 and the moving element 35. Each moving element 35 includes a moving element power transfer unit 305 that is configured to interact with a track power transfer unit 310 provided on the track section 25. In this particular embodiment, the moving element power transfer unit 305 includes one or more extensions 315 protruding toward the track section 25 and the track power transfer unit includes corresponding extensions 320 on the track section 25 configured such that the moving element extensions 315 fit in between the track extensions. The moving element power transfer unit and the track power transfer unit are configured to inductively transfer power to the moving element, particularly while the moving element is moving. In this embodiment, the provision of a plurality of track power transfer units along the track at regular intervals or potentially continuous and the inter-engaging structure of the extensions is intended to provide for a greater and more consistent transfer of power since there can be a smooth transfer of power with multiple induction elements.

The extensions are sometimes referred to as power pick-up panels, energy pick-up elements, inductive pick-up elements or inductive panels. In the current embodiment, inductive transfer of power is used, and it will be understood that a single or larger number of induction panels may also be used. Generally speaking, the induction panels include at least one induction pick-up coil (not shown) and one or more ferrite cores (not shown). The field of induction coils is well known and an appropriate coil and/or ferrite core arrangement can be chosen depending on the required power transfer.

As shown in FIG. 5, in various embodiments, the moving element may also include an enclosure 225 for power management, accessory controller, battery or the like. The moving element may also include an enclosure 230 for a DC/DC converter where needed. The track section may also include an enclosure 27 for electronics, central or track section controller, or the like.

It will be understood that, for some embodiments, the system for transferring power wirelessly may be configured in other ways as long as power is made available to the moving element (for purposes other than driving the moving element) while it is moving. One other example of providing power to a moving element is provided in U.S. Pat. No. 10,300,793, granted May 28, 2019. In some embodiments, the track may include an inductive cable and the moving elements may include inductive pick-up elements that interact with the inductive cable. In some cases, the inductive power transfer may use high frequency power transfer techniques.

It will be understood that various accessories my be provided depending on the part being handled, the needs of the manufacturing or conveyor system or the like. The ability to have power available on the moving element while the moving element is moving, and, in particular, consistent, reliable power, allows for a variety of different accessories to be provided.

As shown in FIGS. 3-8, one accessory 100 that can be provided to or supported by the moving element 35 may be a rotary gripper 500 (sometimes called a spindle) or plurality of rotatory grippers 500. In some embodiments, the rotary gripper 500 is configured to grip a part and rotate the part about an axis while the part is moved through one or more processes. Since the accessory 100, i.e. the rotary gripper(s) 500, can be powered by power available on the moving element 35, the part can be kept rotating while the moving element is moving. It can be useful to keep a part rotating in order to, for example, keep the product more consistent or the like. For example, some parts may be heated for malleability and need to be rotated so that one side does not deform differently from another. As another example, the part may undergo laser welding, laser marking or some kind of treatment while moving and require rotation to evenly treat different portions of the part. Still further, it can save time to rotate part(s) during transport so the parts are in the correct position or at the required speed as the moving element arrives at a station to allow for higher throughput.

Figure 9:
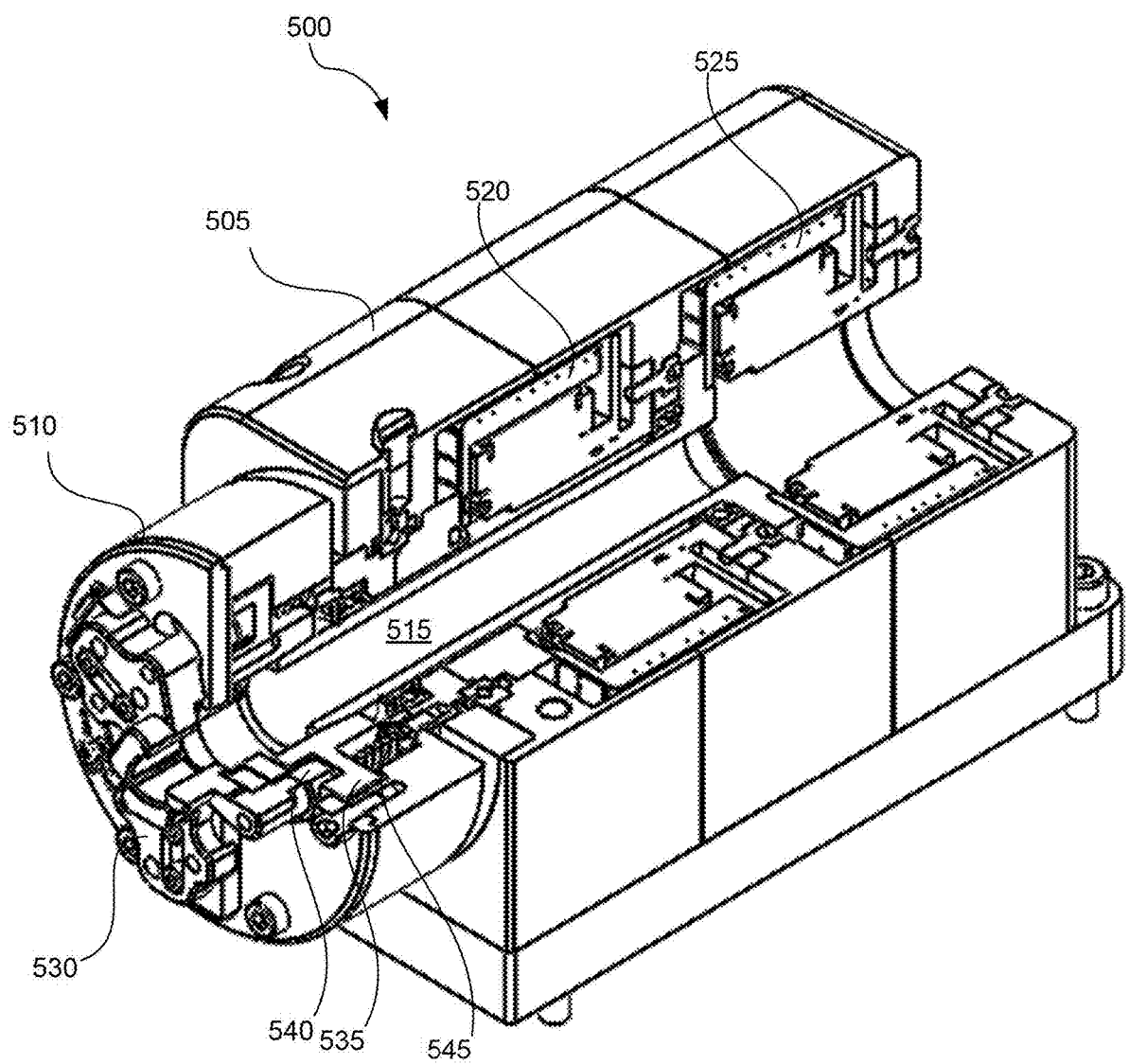
FIG. 9 is a partial cut-away view of an accessory for use with the moving element of FIGS. 7 and 8.

FIG. 9 is a partial sectional view of an embodiment of a rotary gripper 500 that is driven by power provided to the moving element as noted above. The rotary gripper 500 includes a body 505 and a rotary head 510, with the rotary head and body having a hollow shaft 515 formed therein. The body also includes a spindle motor 520 and a gripper motor 525. The rotary head 510 is provided with one or more gripper fingers 530. In some embodiments, the gripper motor 525 is operated to adjust the gripper fingers 530, for example through a mechanical linkage or the like, to grip a part/product inserted into the hollow shaft and the spindle motor is operated to rotate the rotary head, and thus rotate the part/product held by the gripper fingers.

In the embodiment illustrated in FIG. 9, the rotary gripper can further include a cam plate 535, a plurality of cam followers 540, and a plurality of torsion springs 545 as explained below. However, these elements do not need to be present in all embodiments.

In this case, the spindle motor rotates the rotary head (and thus the gripper fingers) about an axis of rotation (which is, for example, a center of the hollow shaft) and establishes the overall rotational speed, acceleration and deceleration of the part being held. In some cases, the rotary gripper may include a spindle encoder for the spindle motor, such that the spindle motor may follow a prescribed motion profile based on the spindle encoder feedback. The gripper fingers are generally at fixed angles relative to the spindle motor. A gripper encoder may also be provided for the gripper motor, if required based on the type of motor used.

As noted above, in some embodiments the rotary gripper 500 includes the cam plate 535 and the plurality of cam followers 540, which are configured such that the cam followers can engage with or be in mechanical communication with an associated gripper finger while also in contact with the cam plate. Each cam follower is configured to move the gripper finger radially based on movement of the cam plate. In particular, the cam plate can be formed with a groove for each gripper finger and its associated cam follower. The grooves in the cam plate can be of a fixed width to match the diameter of the cam follower and have a radial distance from the centreline of the axis of rotation that varies at each angular position around the cam plate.

In this embodiment, the gripper motor is responsible for positioning the cam plate relative to the spindle motor and in turn, positioning the associated cam followers with their associated gripper fingers. The gripper fingers can be used to grip parts/components with force or to locate parts/components by positioning fingers close to the parts/components without force. When closing the gripper fingers to grip or locate a part/component, the gripper motor rotates the cam plate to a position/angle that moves the cam followers and places each gripper finger in an appropriate position for the required task.

When locating, the gripper motor can maintain a relative angular position of the cam plate to the spindle motor. When gripping with force, the closing torque of the gripper motor can be controlled to a predetermined value (potentially plus/minus a predetermined error limit). This limit on the gripper motor torque can be configured such that the gripping force is maintained between a minimum and maximum force. Further, the torque, and thus the gripping force, can be fully programmable.

As shown in FIG. 9, in some embodiments, the plurality of torsion springs 545 can be mounted coaxially with the axis of rotation and may be used to provide a complimentary torque to assist in closing or opening the gripper fingers as required.

In some embodiments, the rotary gripper and cam plate can be configured such that, during angular acceleration, both motors are rotating in a common direction and providing complimentary torques for acceleration. With this configuration, the motor torques will counteract each other during deceleration. In some embodiments, the cam profile configuration can be reversed, which will reverse the complimentary or counteracting torques during acceleration or deceleration. The configuration can be determined as desired according to the motion profile requirements or other process requirements.

In some embodiments, the gripping motor torque can be configured to provide either a varying gripping force at varying diameters or an identical gripping force at all diameters of parts/components. As noted above, the gripping forces are adjustable/configurable/programmable.

A benefit of this configuration of the rotary gripper, such as shown in FIG. 9, is that each motor can be directly coupled to its associated rotating elements resulting in a stiff system which can respond quickly to errors associated with position or torque. This configuration can also provide reduced weight and reduce/eliminate any need for transmission elements, which may wear and/or require maintenance. The provision of the torsion spring can allow parts to be held by the gripper even when power to the motors is off. Further, the ability to adjust the gripper fingers variably allows the rotary gripper to grip a range of part diameter sizes without changing out the gripper fingers. The range is determined by the dimensions of, for example, grooves on the cam plate. Still further, in a case where there are multiple rotary grippers, it is possible to control the rotary grippers separately, something that would be much more difficult if an external drive (not on the moving element) were in use. Lastly, the configuration of having power delivered to the accessory/rotary gripper reduces or eliminates any need for external contact with belts or other mechanical components to drive the accessory. This provides for a cleaner assembly line with less chance of debris or the like being generated.

Figure 10:
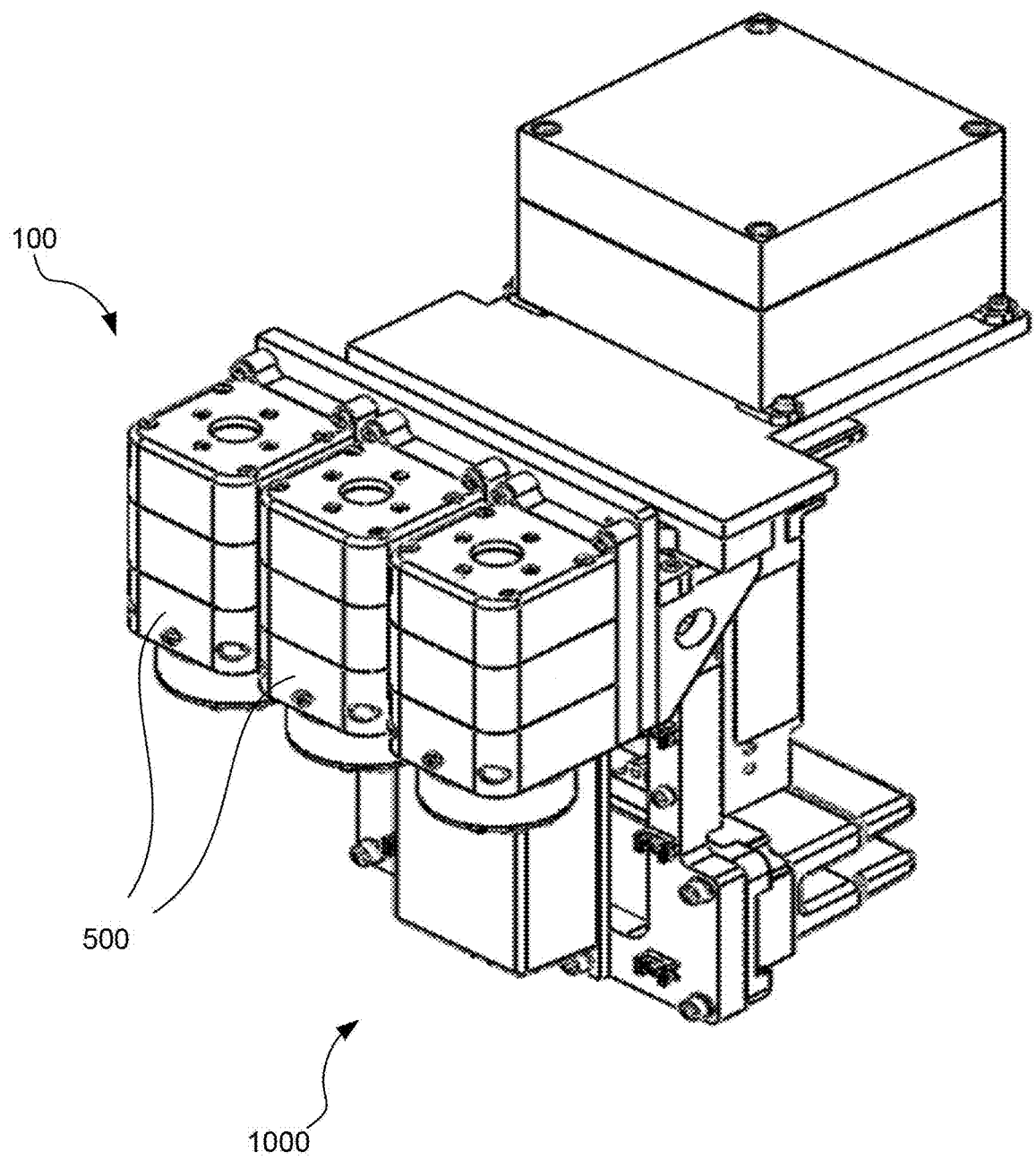
FIG. 10 is a front perspective view of another embodiment of a moving element with mounted accessories.
Figure 11:
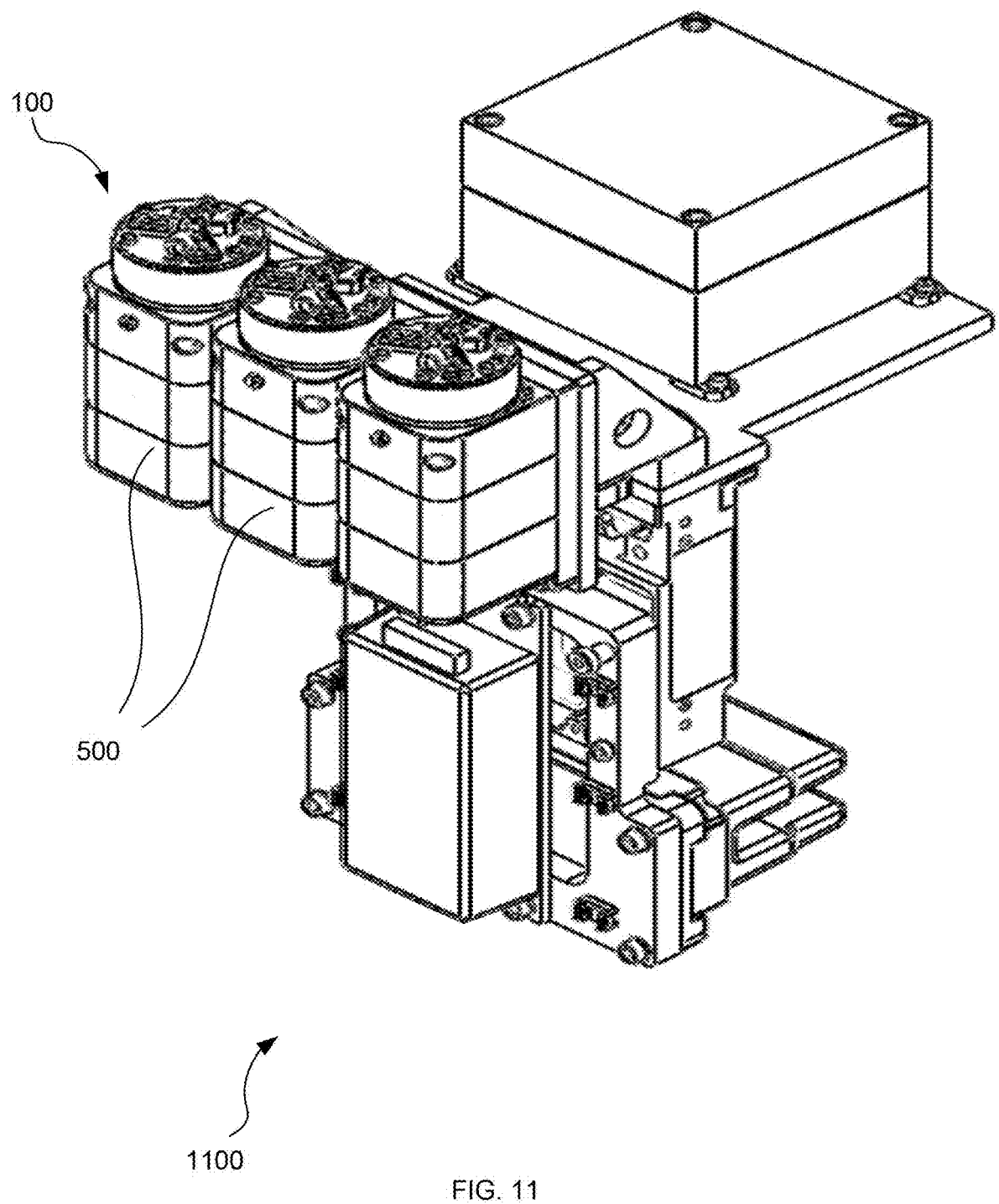
FIG. 11 is a front perspective view of another embodiment of a moving element with mounted accessories.

FIGS. 10 and 11 illustrate other embodiments of a moving element and related accessory 1000, 1100. In these embodiments, the accessory 1000, 1100 is a plurality of rotary grippers similar to the rotary gripper 500 which are mounted such that they are facing upward or downward to illustrate that various positions may be possible. In some cases, the accessory 1000, 1100 may be mounted to an adjustable mount such that the position can be changed when stopped or a further motor can be added to the moving element to allow adjustment of the accessory 1000, 1100 during movement, using, for example, power supplied to the moving element. The ability to adjust the position/orientation of the accessory is facilitated when there is no need for an external power source. Further, the weight of items on the moving element can be reduced when there is no need for battery storage such as a battery or the like.

It will also be understood that, depending on the size of the moving element, the accessory can include a plurality of items such as the rotary grippers discussed herein. In particular, the accessory may be one rotary gripper or more up to the number that can be accommodated on the moving element. Still further, due to the availability of power on the moving element, the accessory can be any of various types including grippers, part/component adjustment mechanisms, motors or various kinds, robots, or the like.

Figure 12A:
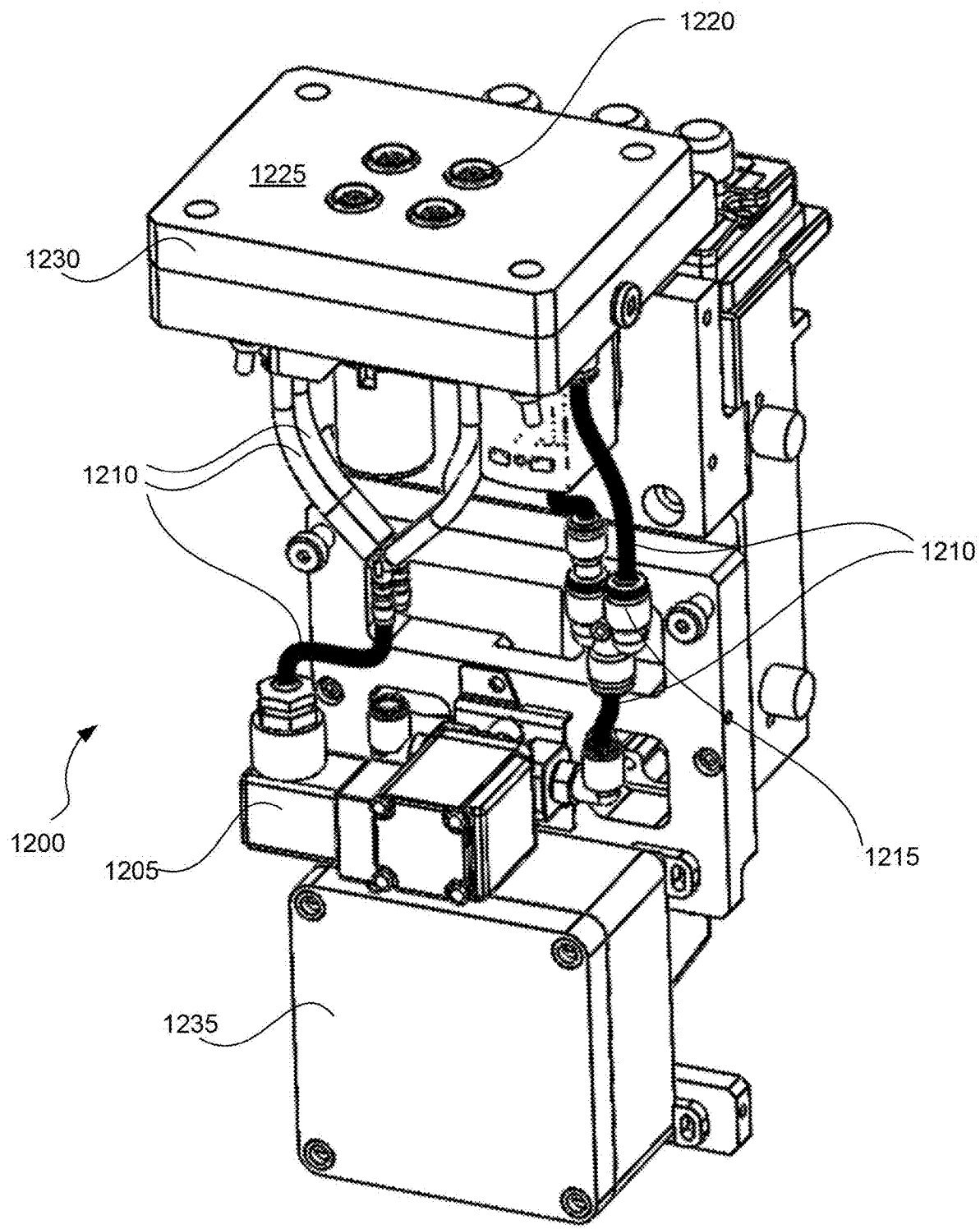
FIG. 12A is a perspective view of a vacuum system 1200 provided as an accessory to a moving element.
Figure 12B:
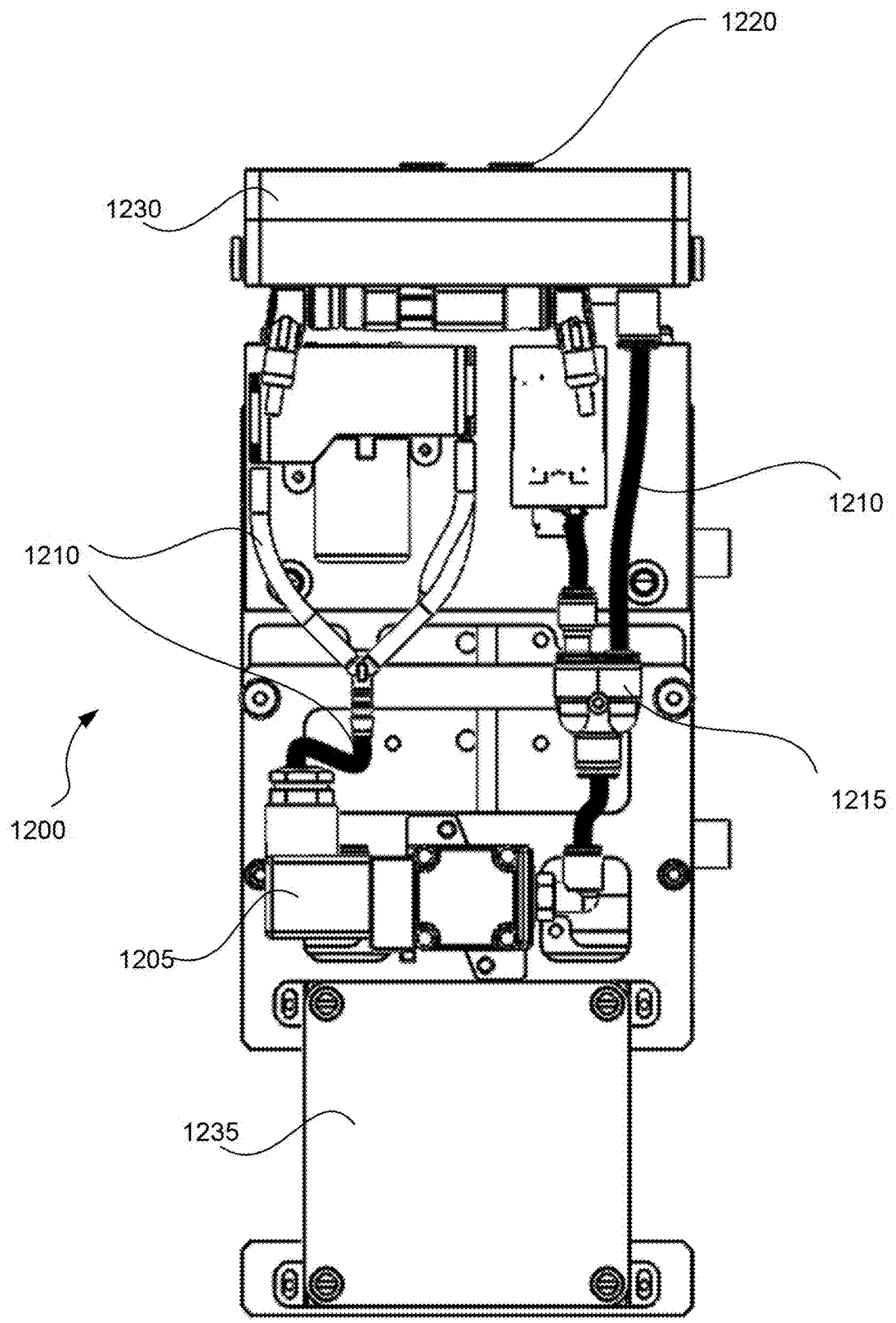
FIG. 12B is a front view of the vacuum system of FIG. 12A.
Figure 12C:
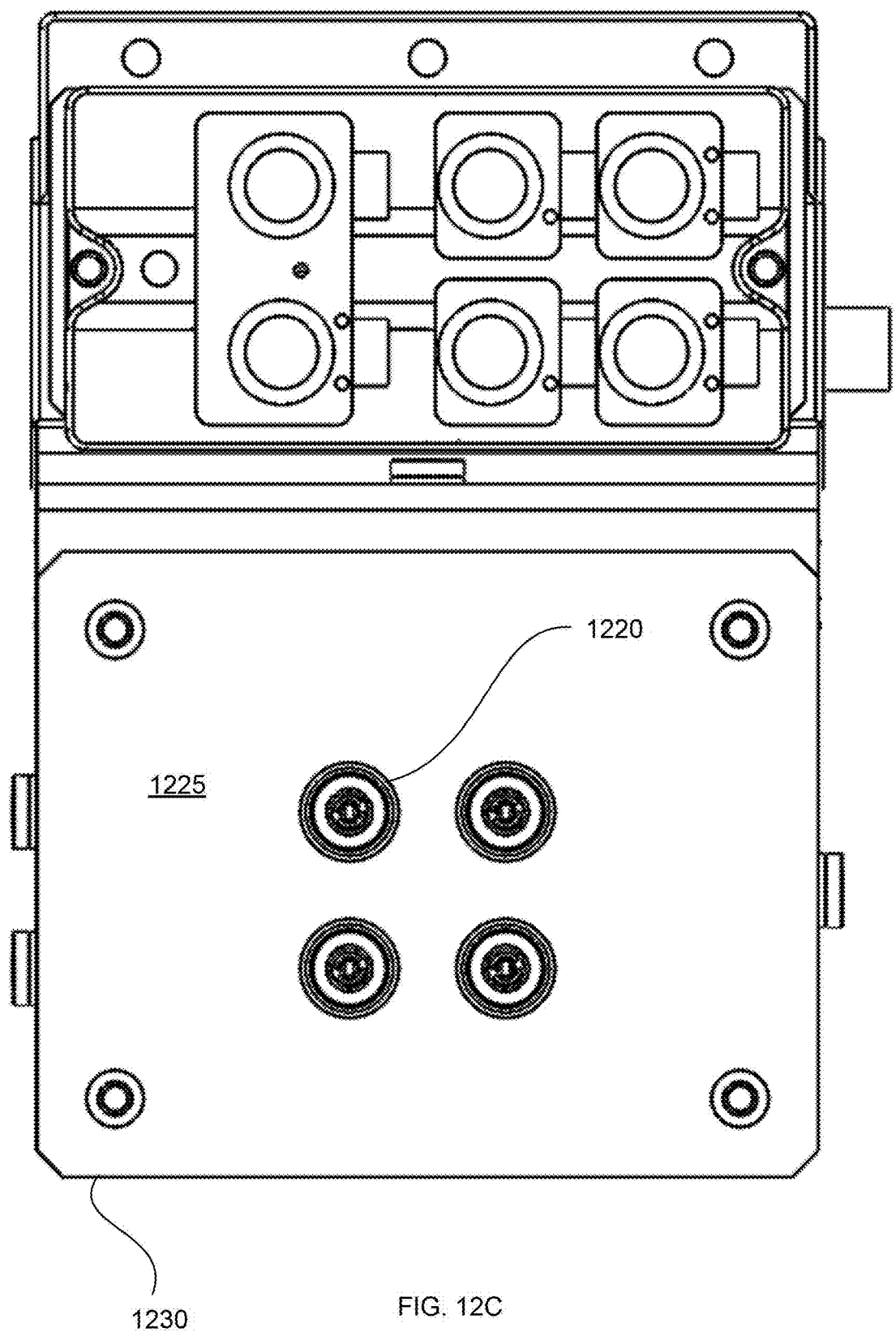
FIG. 12C is a top view of the vacuum system of FIG. 12A.

FIGS. 12A, 12B, 12C illustrate another accessory 1200 that can be provided on a moving element and powered by inductive power provided to the moving element. FIG. 12A is a perspective view of a vacuum system 1200 provided to a moving element. FIG. 12B is a front view and FIG. 12C is a top view of the vacuum system 1200. The vacuum system 1200 includes a vacuum pump 1205 and hoses 1210 to allow for the creation of a vacuum at an opening 1220 on a surface 1225 of a pallet 1230 carried by the moving element. There may also be one or more valves 1215 to, for example, allow for retention of vacuum even if the power isn't in use or available. In this way, the use of a valve may also allow for power savings but may also require an additional control signal. The vacuum pump 1205 can be controlled by an accessory controller in, for example, an enclosure 1235 on the moving element. Having a vacuum source available at the moving element can allow for easier handling of delicate/fragile parts such as glass, solar panels or the like that might be harmed by more direct contact. Vacuum can also be useful in handling parts that may lack available or useful mechanical gripping surfaces, have unusual shapes or the like. For example, parts that have an irregular shape or where there are parts with different sizes/formats that need to be gripped on the same moving element.

Figure 13A:
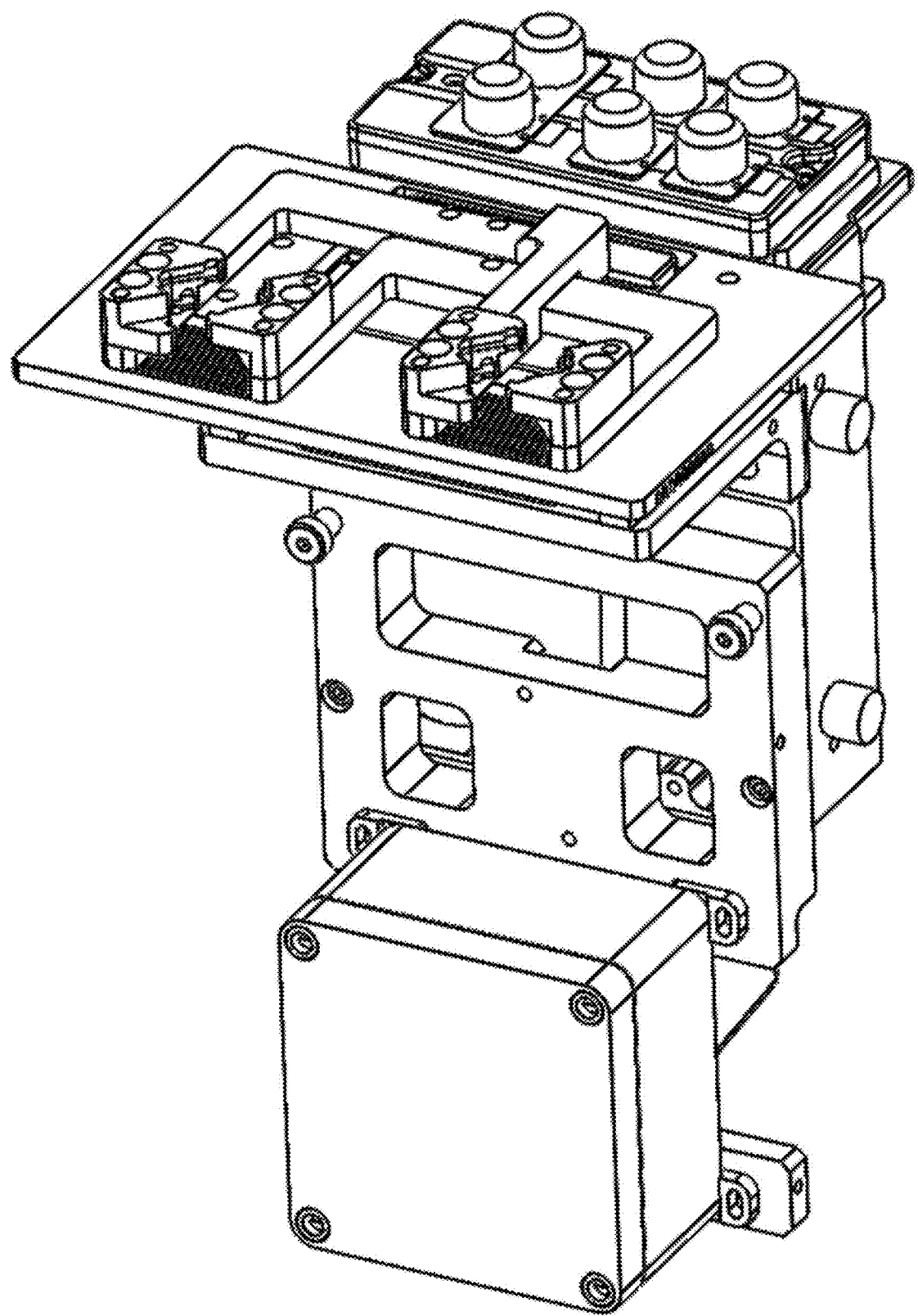
FIG. 13A is a perspective view of a gripper system 1300 provided as an accessory to a moving element.
Figure 13B:
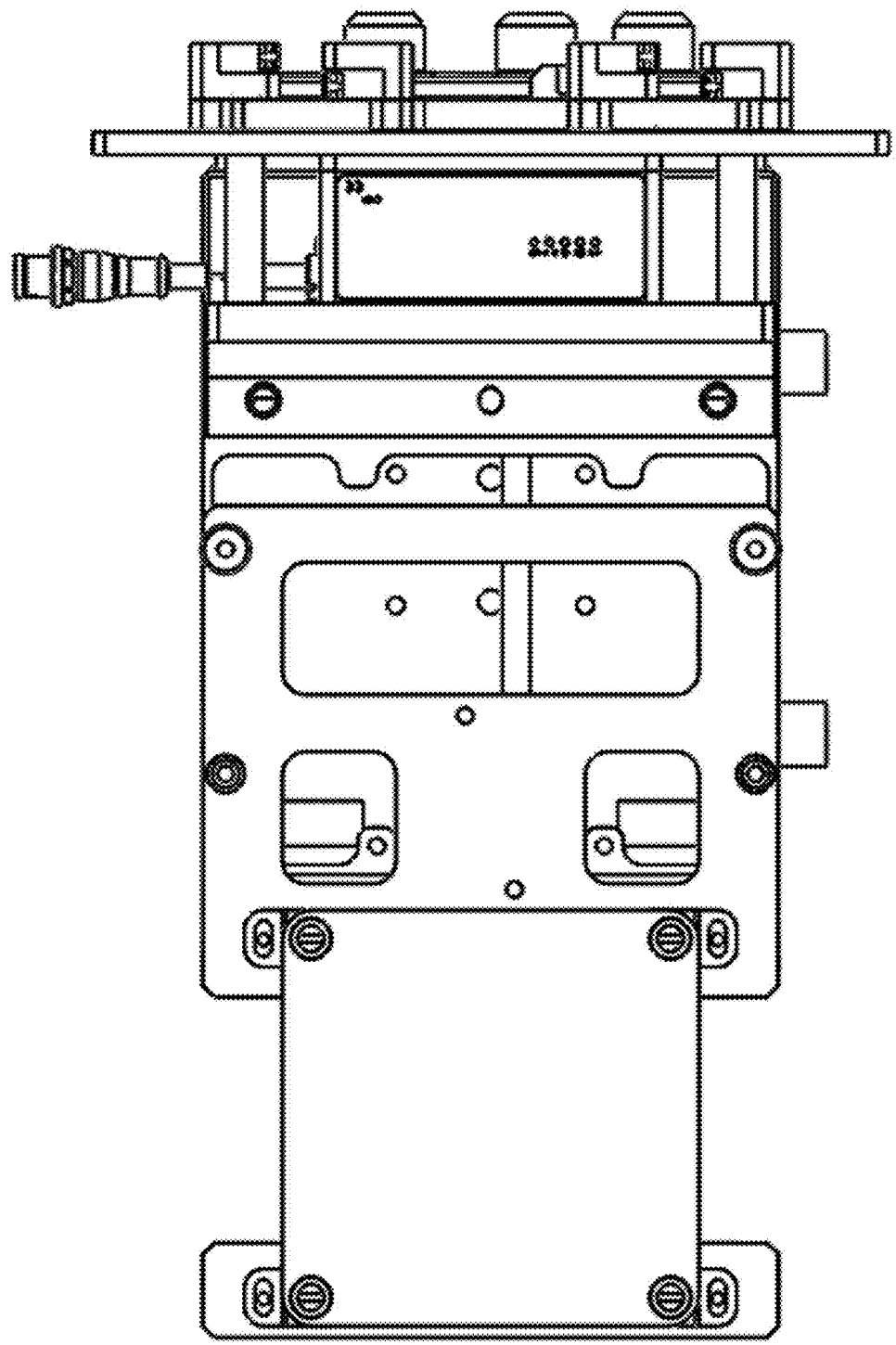
FIG. 13B is a front view of the gripper system of FIG. 13A.
Figure 12C:
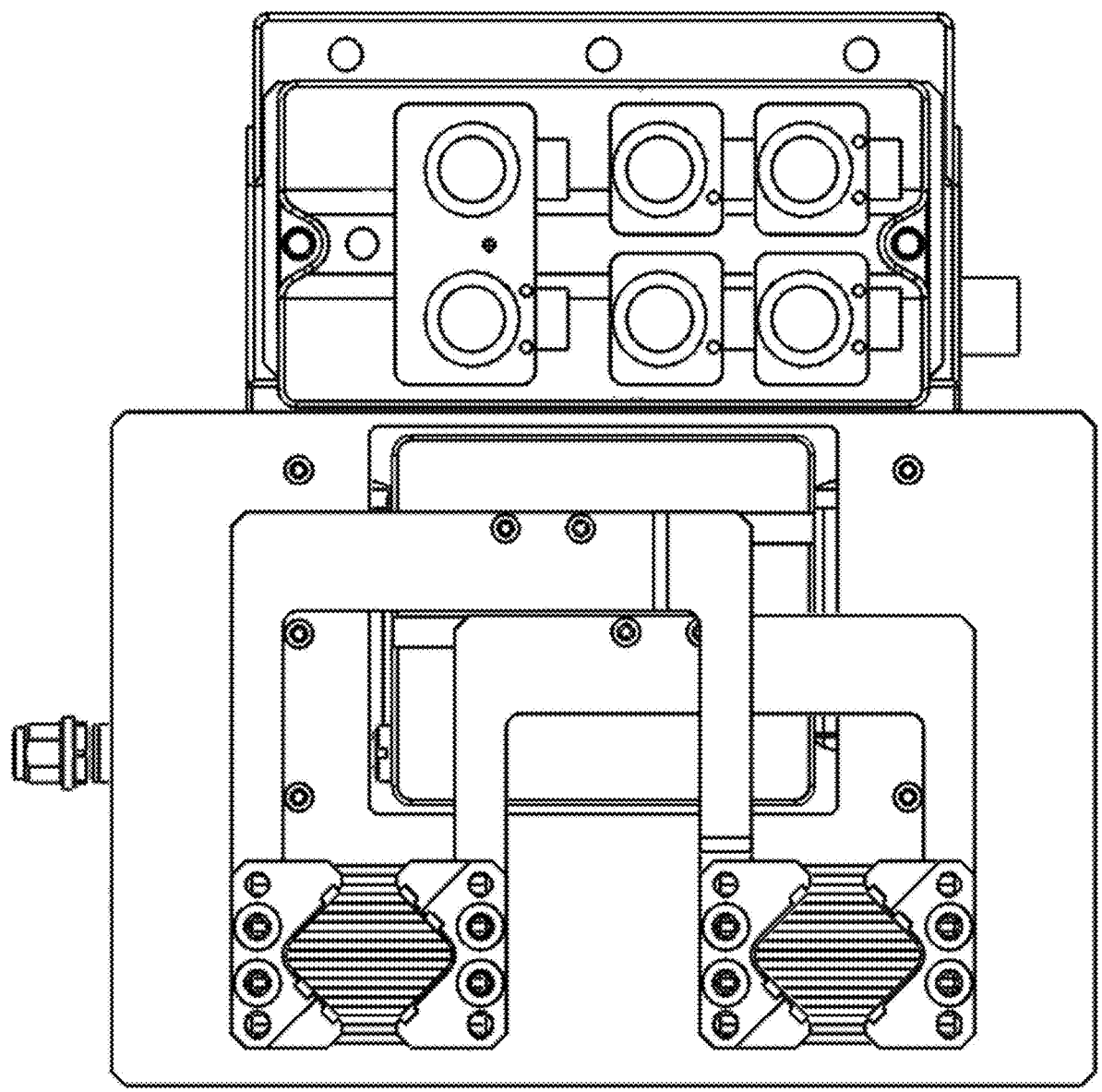

FIGS. 13A, 13B, 13C illustrate another accessory 1300 that can be provided on a moving element and powered by inductive power provided to the moving element. FIG. 13A is a perspective view of a gripper system 1300 provided to a moving element. FIG. 13B is a front view and FIG. 13C is a top view of the gripper system 1300. The gripper system 1300 includes a drive mechanism and gripper arms that can be moved by the drive mechanism to allow for gripping items on a surface of a pallet carried by the moving element. The gripper system may also include a feedback mechanism. The gripper system 1300 can be controlled by an accessory controller in, for example, the enclosure on the moving element. The gripper system can be used for applications that require some form of adjustable containment (perhaps with a clearance) for a range of part sizes or the like. In some cases, the gripper system can be used to check part weight without having to transfer the part to a separate weigh station. Further, some gripper arms may have force control to allow for gripping delicate parts at a controlled force. In some other cases, the use of a gripper system on the moving element may allow for easier handling of rejected parts or the like.

Figure 14A:
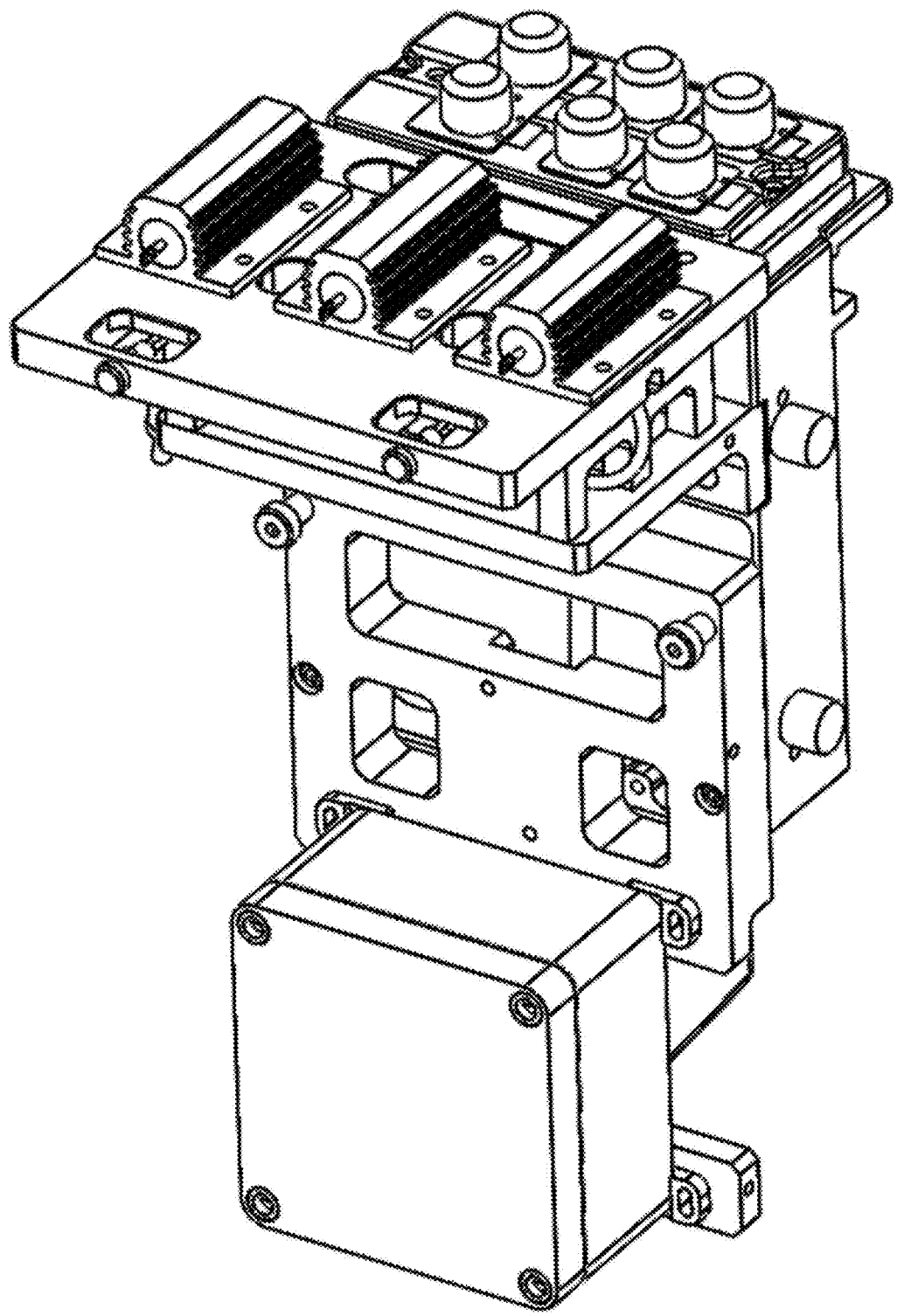
FIG. 14A is a perspective view of a resistance heating system 1400 provided as an accessory to a moving element.
Figure 14B:
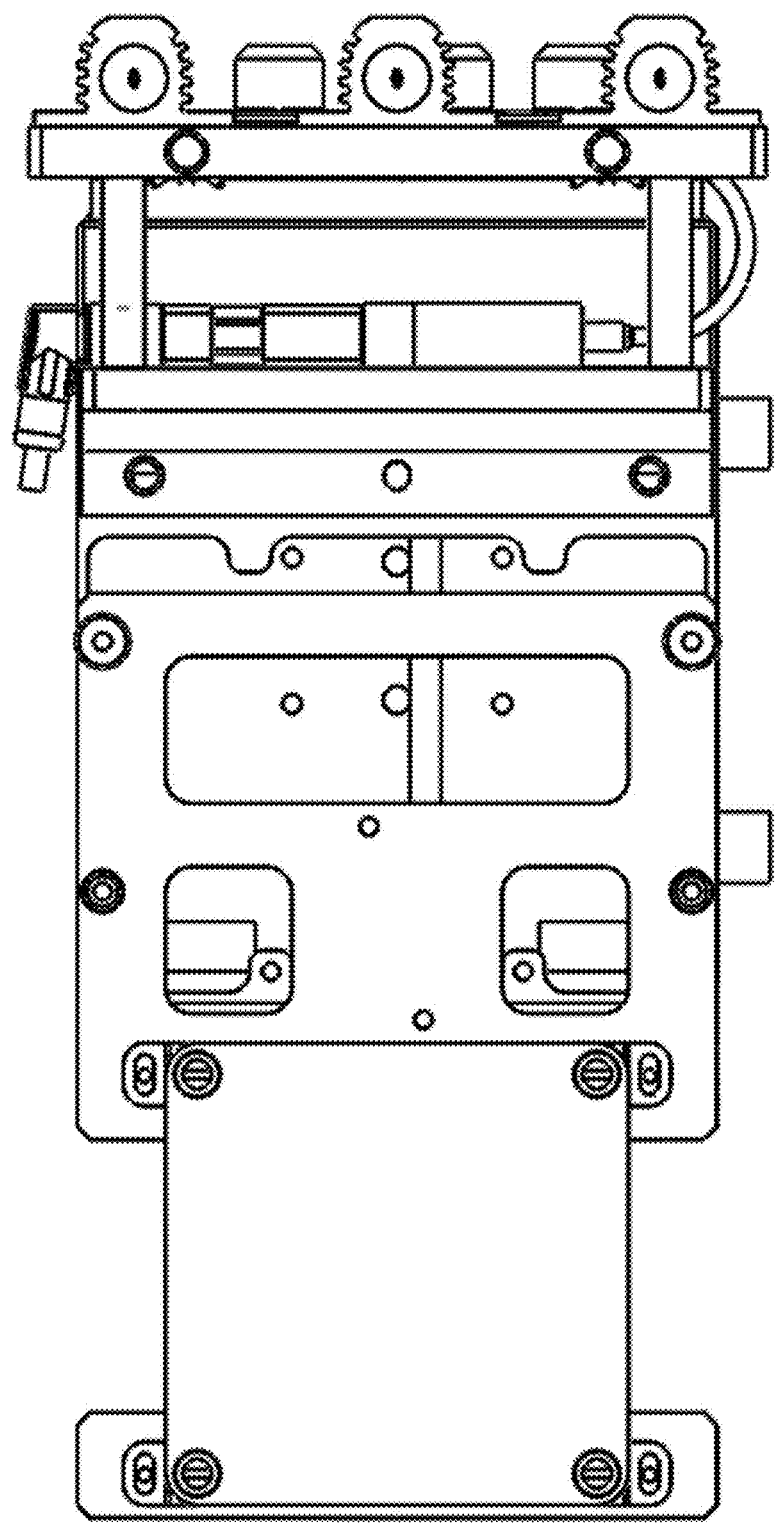
FIG. 14B is a front view of the resistance heating system of FIG. 14A.
Figure 14C:
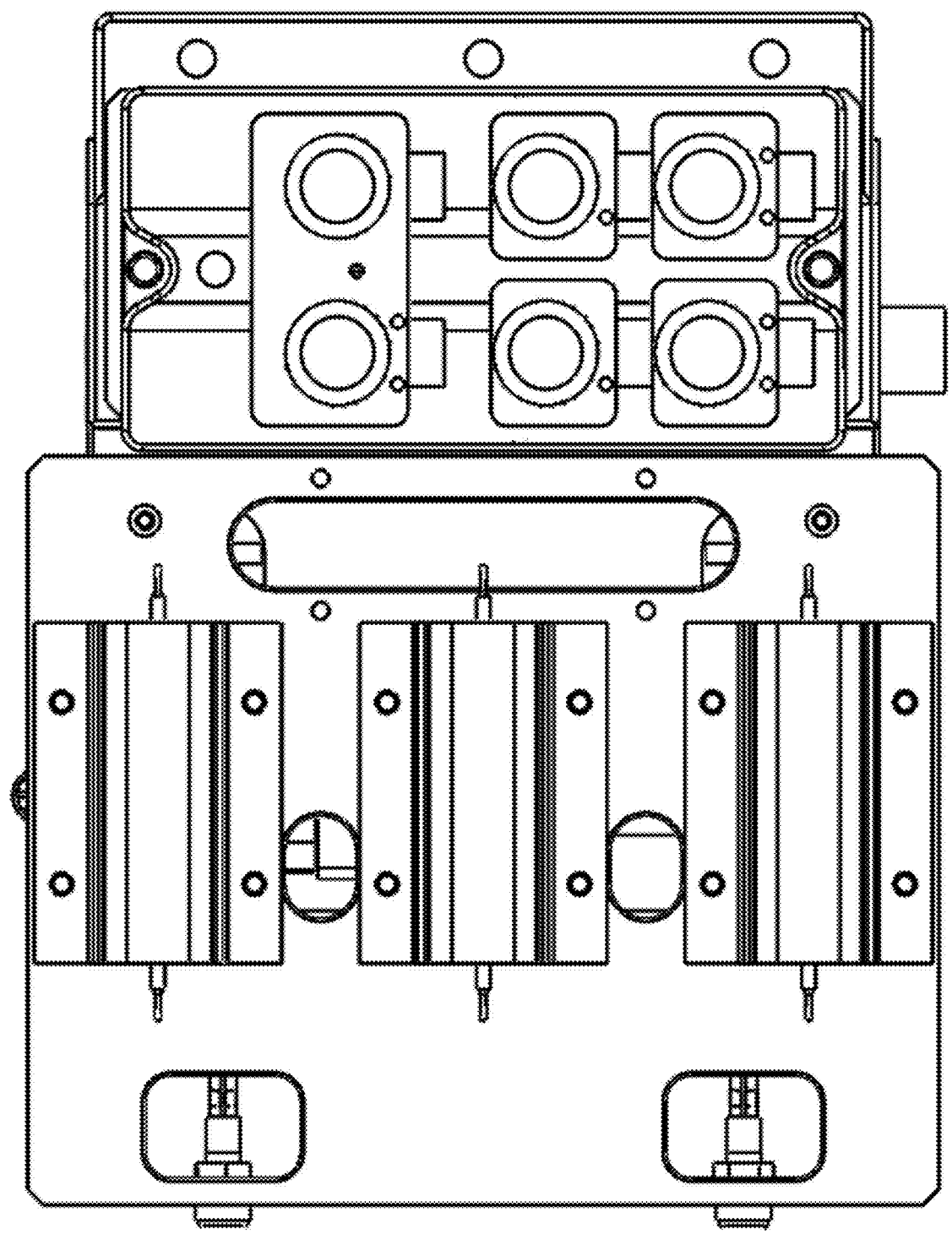
FIG. 14C is a top view of the resistance heating system of FIG. 14A.

FIGS. 14A, 14B, 14C illustrate another accessory 1400 that can be provided on a moving element and powered by inductive power provided to the moving element. FIG. 14A is a perspective view of a heating/cooling system 1400 provided to a moving element. FIG. 14B is a front view and FIG. 14C is a top view of the heating/cooling system 1400. The heating/cooling system 1400 includes one or more heating/cooling elements (in this example, there are three heating elements) that can be provided with power to heat or cool a part or the environment of the moving element. In some cases, there may be a cover over the moving element or the part/heating cooling element. In some cases, there may also be one or more feedback sensors or the like to provide a controller with data on the temperature of the heating/cooling system, of the environment, of the part, or the like. The resistance heating system 1400 can be controlled by an accessory controller in, for example, the enclosure on the moving element. A heating/cooling system can be useful on a moving element when handling sensitive chemical processes/dispensing or the like. Further, a heating/cooling system can be useful for curing adhesives or the like during transit, holding temperatures following sealing or heat staking to reduce the time a part is held at a station. In embodiments providing heating, the heating can be provided by a resistance heating element. In embodiments providing cooling, the cooling can be provided by a Peltier device/TEC and applying a current.

Figure 15:
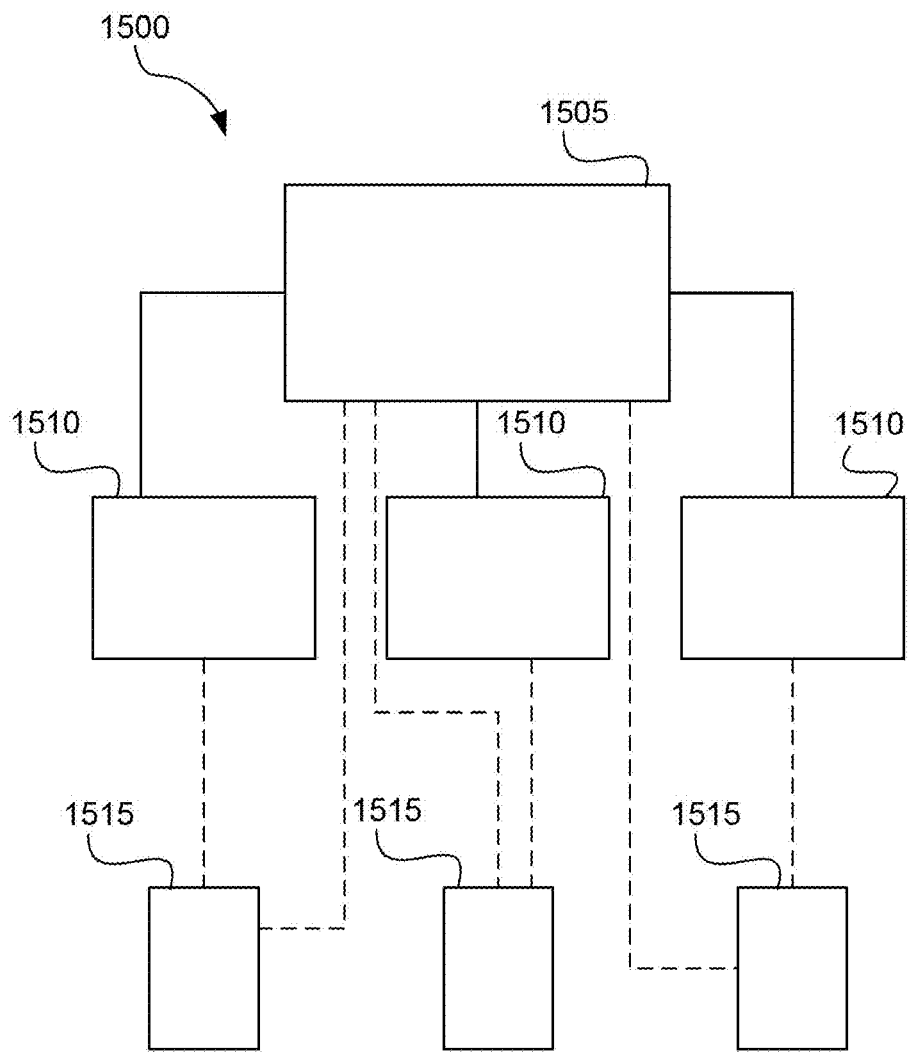
FIG. 15 is a block diagram of an embodiment of a control system/architecture for controlling embodiments of a conveyor system as described herein, including moving elements and one or more accessories on the moving elements.

FIG. 15 is a block diagram of an example embodiment of a control system 1500 for the conveyor system 20. As shown in FIG. 15, the conveyor system 20 can include a central controller 1505 that controls the overall conveyor system 20. The conveyor system may also include a plurality of track section controllers 1510, for example, one for each of the track sections 35. Either the central controller 1505 or the track section controller 1510 may also control the accessory on the moving element or an accessory controller 1515 provided to control the operation of the accessory. There may be control signals in both directions between the controllers. It will be understood that, in some cases, the movement of the moving element may be controlled to work in relation to or in synchronization with the control of the accessory for co-ordinated operations or the like.

In some embodiments, the track section controllers 1510 may be connected to one another in a peer-to-peer communications network such that, for example, each section controller 1510 may be connected to preceding and following section controllers 1510 through a communications link or the like, rather than each section controller being connected to the central controller. Some alternative embodiments may include use of the central controller 1505 to convey information/data between/among section controllers 1510 and/or accessory controllers 1515 or the like.

The various controllers may be connected via, for example, input/output (I/O) or network modules or the like. The controllers may provide instructions to both the accessories and the track section 25/moving element 35, such as directing the next destination for a moving element 35 along the track, providing instructions to operate in a specific way depending on the location of the moving element on the track section, or the like. For example, the rotary gripper may be controlled to rotate a part/component as the moving element moves past a flame station adjacent to the track section such that the part/component is uniformly heated around a circumference or the like.

When inductive power is available on the moving element/pallet, it is useful to also be able to communicate with the accessory provided on the moving element in a wireless manner. In some cases, it may also be useful to communicate with or among track section controllers in a wireless manner. However, the provision of wireless instructions to accessories in a manufacturing environment can be difficult due to the need for high levels of reliability and the fast communications that are needed due to the fast speeds and accelerations of the conveyor and automation stations. The fast communications typically require smaller/faster communications, but reliability typically requires more data. The difficulty of communications can be increased when the accessory is more complex and may have more commands that can be performed, such as where servo motors and sensors are used.

Figure 16:
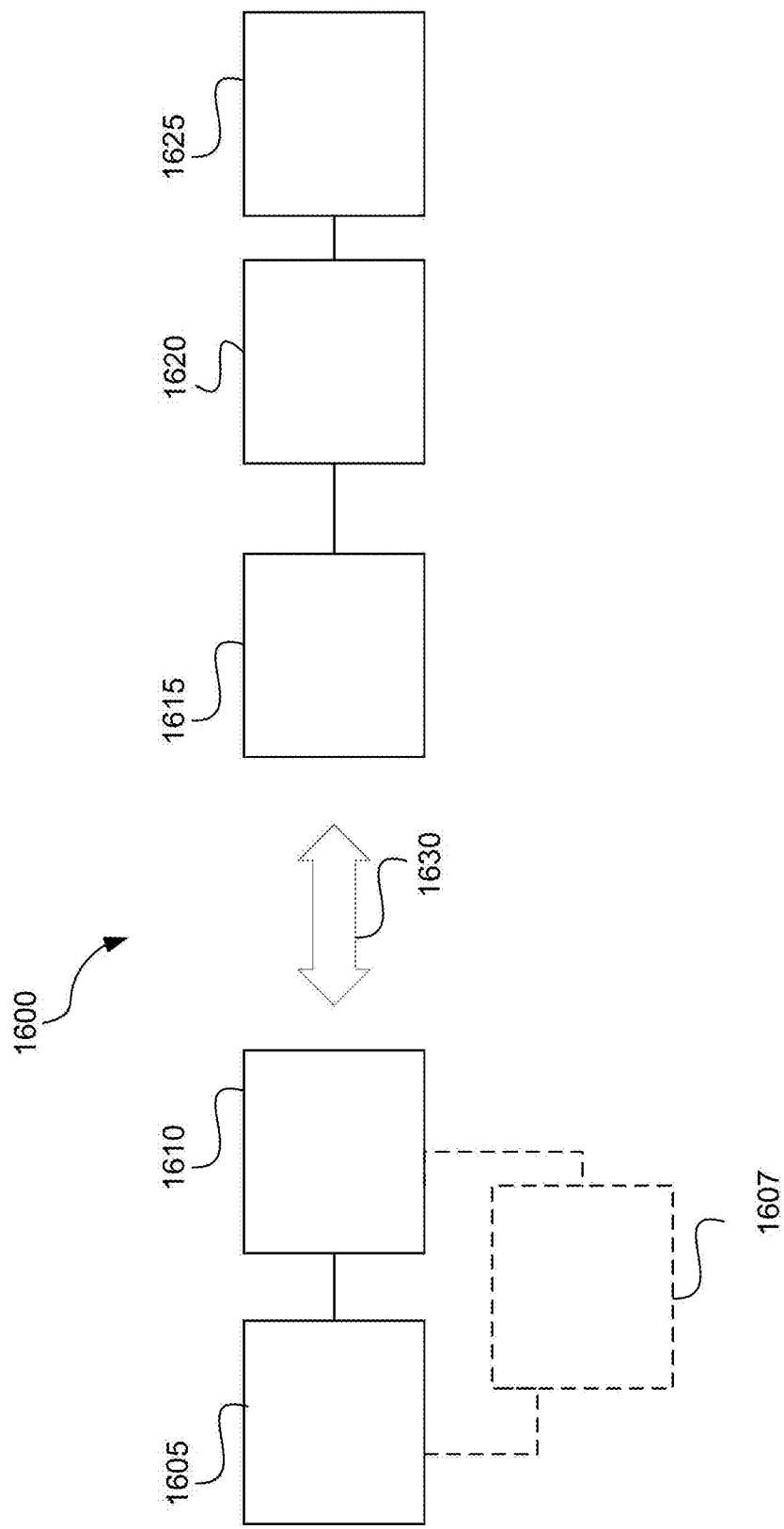
FIG. 16 is a block diagram of an embodiment of a wireless communication system 1600 that can be used with embodiments of a conveyor system as described herein.

FIG. 16 is a block diagram of an embodiment of a wireless communication system 1600 that can be used with embodiments of the conveyor system herein. Although the illustrated wireless communication system 1600 is directed at communication to an accessory (from either a central controller or a track section controller), a similar approach may be available for communications from a central controller to a track section controller or the like.

As noted, in FIG. 16, the wireless communication system 1600 is configured to allow communication between a conveyor or track controller and an accessory controller. The wireless communication can include a master controller 1605 (for example, a programmable logic controller (PLC) or the like), a downlink converter/transmitter 1610, an accessory receiver/transmitter 1615, an accessory interface 1620, and an accessory 1625. The master controller 1605 may be the central controller for the conveyor system and communicate with the downlink converter/transmitter directly or, in some cases, the communication may be from a master controller via a track section controller 1607, depending on the overall communications approach determined in relation to FIG. 15.

In this arrangement without the track section controller 1607, the master controller 1605 can issue instructions to the accessory and the instructions will be converted/translated by the downlink converter 1610 to a more concise communication format/protocol for transmission over the wireless link (illustrated by arrow 1630). The concise format instructions are received by the accessory receiver/transmitter 1615 and passed to the accessory interface 1620, which provides instructions to the accessory 1625. In some cases, the accessory interface 1620 may convert the instructions for the accessory 1625, if needed. The concise communication format/protocol can use multiple repeat messages with error checking and can generally limit each message to as small a size as possible by using, for example, default states, default conditions, and the like.

In some embodiments, the concise communication format may be adapted depending on the accessory involved. For example, servo motors or accessories with multiple motors, multiple controls, feedback loops, or the like, may involve more complex commands and may require a more detailed the communication format/protocol. Further, in some cases, there may be some commands that overlap among accessories and can be standardized. Still further, the amount of bandwidth and speed of communication required may also determine the level of translation/conversion required and whether or not additional conversion may be needed at the accessory interface.

FIGS. 17A and 17B are basic examples of a downlink (master to accessory) message and an uplink (accessory to master) message illustrating the message size and potential content. As illustrated, each message is limited to 2 or fewer bytes. As shown in FIG. 17B, the accessory may include a heartbeat signal of 1 bit that toggles at a predetermined period/frequency to indicate that communications are active and the accessory is available. This type of heartbeat signal provides redundancy so that the communication channel can be regularly checked for errors. Further, because each message is so short, the time between exchanges of messages is very short and multiple messages can flow during commands being executed so that, even if one message is missed, the next message will convey the same information for redundancy of communication. Further, as noted in FIG. 17A, the downlink message may include a simplified command, such as a coded command ID, that indicates a command that can be translated/converted at or enroute to the accessory to allow completion of a pre-configured command or command sequence.

The embodiments herein have been disclosed with a certain degree of particularity for the purpose of description but not of limitation. Those skilled in the art will appreciate that numerous modifications and variations can be made to the embodiments without departing from the spirit and scope of the application.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device and can interface with circuitry to perform the described tasks.

While the above description provides examples of one or more processes or apparatuses, it will be appreciated that other processes or apparatuses may be within the scope of the disclosure. It will also be understood that the processes and apparatuses may be implemented using hardware or software components or an appropriate combination thereof. Software may be provided as instructions on a physical computer medium or the like for execution on a processor of a computing device.

We claim:

1. A method for wireless communication with an accessory on a pallet in a conveyor system, the conveyor system includes a conveyor and a plurality of pallets that travel on a track of the conveyor, the method comprising:
formulating a command from a master controller of the conveyor system to be sent to an accessory controller of an accessory on a pallet of the conveyor system, the accessory is configured to perform a task on a part travelling on the conveyor;
translating, using a downlink converter/transmitter, the command from the master controller into a simplified protocol;
transmitting the simplified command via a wireless communications channel to a wireless receiver of the pallet;
receiving the simplified command at the wireless receiver of the pallet, and transmitting the received simplified command to the accessory controller;
processing the simplified command by the accessory controller;
causing, by the accessory controller, the accessory of the pallet to perform an operation on the part traveling on the conveyor based on the wireless communications comprising the translated, simplified command sent to the accessory controller originally sent by the master controller;
formulating a response to be sent to the master controller from the accessory controller;
transmitting the response from the accessory controller via the wireless communications channel to the master controller, wherein during the transmission of the response to the master controller, translating the response into a simplified protocol; and
receiving the simplified response at the master controller.

2. The method according to claim 1, further comprising, between the receiving and processing, translating the simplified command from the simplified protocol to an accessory protocol and, between the formulating a response and transmitting the response, translating the response from an accessory protocol to a simplified protocol.

3. The method according to claim 1, wherein the simplified protocol comprises a signal at a predetermined frequency to indicate that communications are active.

4. The method according to claim 1, wherein the simplified protocol comprises a command code that can be translated to provide a more complex sequence of commands.

5. The method according to claim 1, wherein the simplified protocol comprises messages of fewer than 2 bytes.

6. The method according to claim 1, wherein the translating into simplified protocol comprises selecting a command code related to a series of commands.

7. The method according to claim 1, wherein the simplified protocol comprises sending a plurality of similar messages over a short time frame for redundancy purposes.

8. A system for wireless communication with an accessory on a pallet in a conveyor system, the system comprising:
- a conveyor comprised of at least one track;
- at least one pallet having at least one accessory for performing an operation on a part travelling on the conveyor, each of the at least one pallet being configured to travel on the conveyor;
- a master controller configured to formulate a command to be sent to an accessory interface to cause the accessory on the pallet to perform an operation on the part on the conveyor based on the command;
- a downlink converter/transmitter configured to: translate the command sent by the master controller into a simplified protocol, and send a simplified command via a wireless signal:
- an accessory receiver/transmitter configured to: receive the wireless signal including the simplified command from the downlink converter/transmitter, and transmit the wireless signal comprising the simplified command to the accessory interface, wherein the accessory interface is configured to:
wirelessly communicate the simplified command received by the accessory receiver/transmitter to the accessory on the pallet such that the accessory can perform the operation on the part traveling on the conveyor based on the translated command originally formulated by the master controller,
formulate a response to be sent to the master controller; and
wirelessly send the formulated response to the master controller.

9. The system according to claim 8, wherein the accessory interface is also configured to translate the simplified command into an accessory command that can be executed by the accessory.

10. The system according to claim 8, wherein the simplified protocol comprises a signal at a predetermined frequency to indicate that communications are active.

11. The system according to claim 8, wherein the simplified protocol comprises a command code that can be translated to provide a more complex sequence of commands.

12. The system according to claim 8, wherein the accessory receives power via induction from the conveyor system.

13. The system according to claim 8, wherein the accessory comprises at least one rotary gripper, the rotary gripper comprising:
- a body;
- a gripper motor;
- a rotation motor; and
- a plurality of grippers, wherein the gripper motor is mechanically connected with and configured to open and close the plurality of grippers and the rotation motor is mechanically connected with and configured to rotate the plurality of grippers.

14. The system according to claim 13, further comprising:
- a cam plate mechanically connected to the gripper motor; and
- cam followers in contact with the cam plate and each of the plurality of grippers, wherein movement of the cam plate by the gripper motor controls the opening and closing of the plurality of grippers via the cam followers.

15. The system according to claim 14, further comprising a plurality of torsion springs provided to the cam followers configured to bias the grippers to a closed position.

16. The system according to claim 8, wherein the accessory comprises:
- an accessory controller provided to the pallet; and
- at least one gripper mounted on the moving element and in communication with the accessory controller, the gripper comprising:
  - one or more gripper arms; and
  - a drive mechanism configured to move the one or more gripper arms, wherein the accessory controller is configured to operate the gripper arms via the drive mechanism based on wireless communications from a master controller.

17. The system according to claim 16, further comprising:
- a weigh scale provided to the gripper arms configured to weigh a part held by the gripper arms.

18. The system according to claim 8, wherein the accessory comprises:
- an accessory controller provided to the pallet; and
- a vacuum system mounted on the moving element and in communication with the accessory controller, the vacuum system comprising:
  - a vacuum pump; and
  - one or more hoses connecting the vacuum pump to a vacuum outlet on the moving element, wherein the accessory controller is configured to control the vacuum pump to deliver vacuum at the vacuum outlet on the pallet.

19. The system according to claim 8, wherein the accessory comprises:
- an accessory controller provided to the moving element; and
- a heating system mounted on the moving element and in communication with the accessory controller, the heating system comprising a resistance heater, wherein the accessory controller is configured to control the temperature of the heater by adjusting the power flow through the heater.

20. The system according to claim 8, wherein the accessory comprises:
- an accessory controller provided to the pallet; and
- a cooling system mounted on the moving element and in communication with the accessory controller, the cooling system comprising a Peltier device, wherein the accessory controller is configured to control the temperature by adjusting the power flow through the Peltier device.

* * * * *